(12) United States Patent
Mori et al.

(10) Patent No.: US 11,750,134 B2
(45) Date of Patent: Sep. 5, 2023

(54) AC ROTARY MACHINE APPARATUS

(71) Applicant: Mitsubishi Electric Corporation, Tokyo (JP)

(72) Inventors: Tatsuya Mori, Tokyo (JP); Hiroko Ikeda, Tokyo (JP); Toshihiro Matsunaga, Tokyo (JP); Kenji Ikeda, Tokyo (JP); Kenta Kubo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 32 days.

(21) Appl. No.: 17/629,919

(22) PCT Filed: Sep. 26, 2019

(86) PCT No.: PCT/JP2019/037889
§ 371 (c)(1),
(2) Date: Jan. 25, 2022

(87) PCT Pub. No.: WO2021/059436
PCT Pub. Date: Apr. 1, 2021

(65) Prior Publication Data
US 2022/0376641 A1 Nov. 24, 2022

(51) Int. Cl.
*H02P 6/18* (2016.01)
*H02P 23/14* (2006.01)
(Continued)

(52) U.S. Cl.
CPC ............ *H02P 23/14* (2013.01); *B62D 5/0409* (2013.01); *H02P 25/22* (2013.01); *H02P 27/06* (2013.01)

(58) Field of Classification Search
CPC .......... H02P 23/14; H02P 25/22; H02P 27/06; H02P 29/02; H02P 29/028; H02P 25/026; H02P 21/06; H02P 27/08; H02P 29/024
See application file for complete search history.

(56) References Cited

U.S. PATENT DOCUMENTS 8,963,462 B2 * 2/2015 Mori .................... H02P 6/16
318/700
2019/0260324 A1 8/2019 Kuramitsu et al.
(Continued)

FOREIGN PATENT DOCUMENTS

| EP | 3 540 937 A1 | 9/2019 |
| WO | 2018/088465 A1 | 5/2018 |
| WO | 2019/123634 A1 | 6/2019 |

OTHER PUBLICATIONS

International Search Report for PCT/JP2019/037889 dated Dec. 10, 2019 (PCT/ISA/210).
(Continued)

*Primary Examiner* — Muhammad S Islam
(74) *Attorney, Agent, or Firm* — Sughrue Mion, PLLC; Richard C. Turner

(57) ABSTRACT

To provide an AC rotary machine apparatus which can determine the operation stop of the control circuit of the other system with good accuracy. An AC rotary machine apparatus, including: a resolver is provided with a first system excitation winding, first system two output windings, a second system excitation winding, and second system two output windings, in which a magnetic interference occurs between a first system and a second system; a first system control circuit that applies AC voltage with a first period to the first system excitation winding; and a second system control circuit that applies AC voltage with a second period to the second system excitation winding, wherein the first system control circuit determines whether the operation of the second system control circuit stops, based on the components of the second period extracted from the first system output signals.

8 Claims, 21 Drawing Sheets

(51) Int. Cl.
*B62D 5/04* (2006.01)
*H02P 25/22* (2006.01)
*H02P 27/06* (2006.01)

(56) References Cited

U.S. PATENT DOCUMENTS

2019/0267926 A1  8/2019  Tsubaki et al.
2020/0343847 A1  10/2020  Miyashita

OTHER PUBLICATIONS

European Search Report dated Jul. 25, 2022 from the European Patent Office in EP Application No. 19947178.0.

* cited by examiner

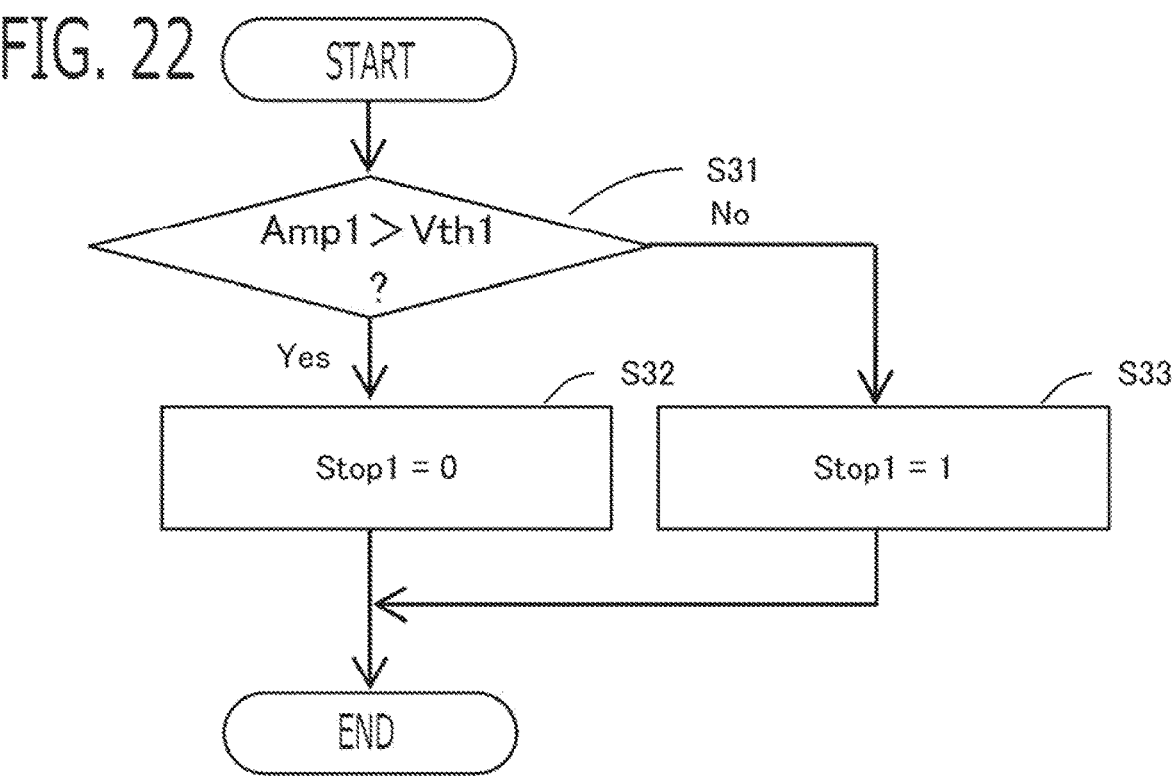
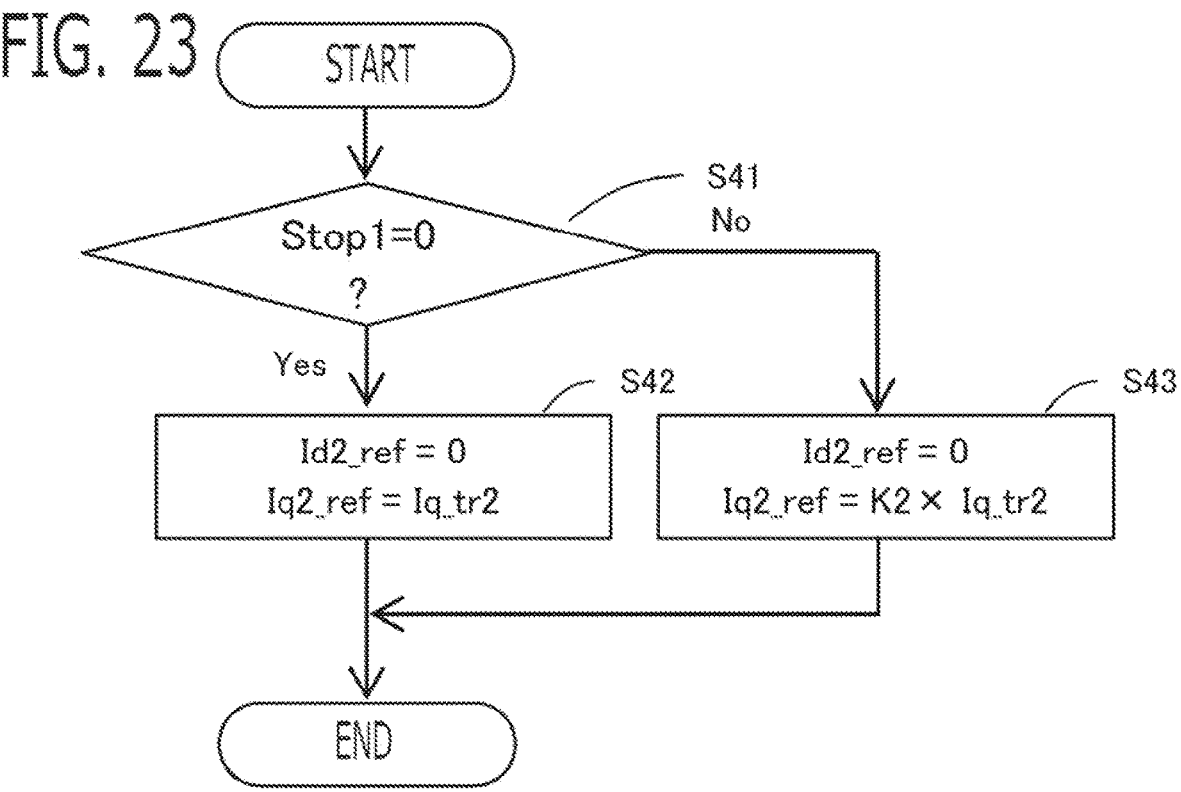

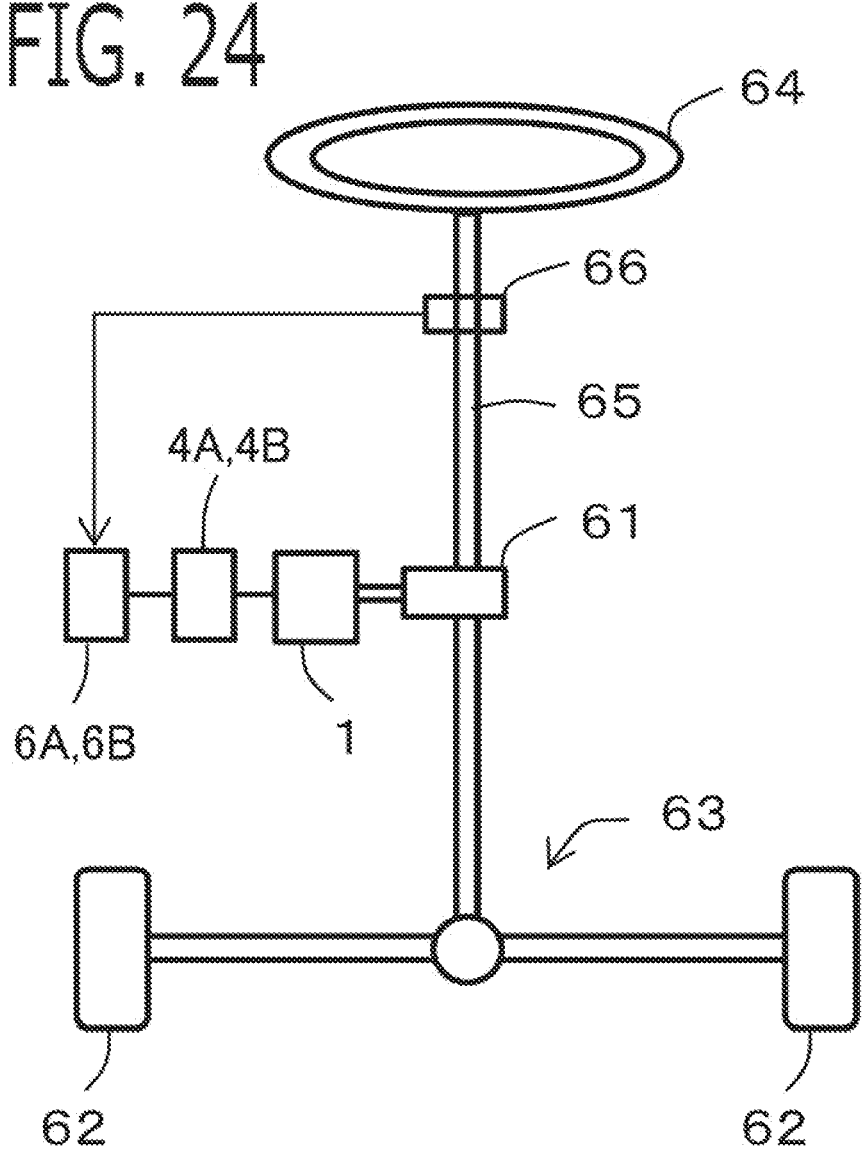

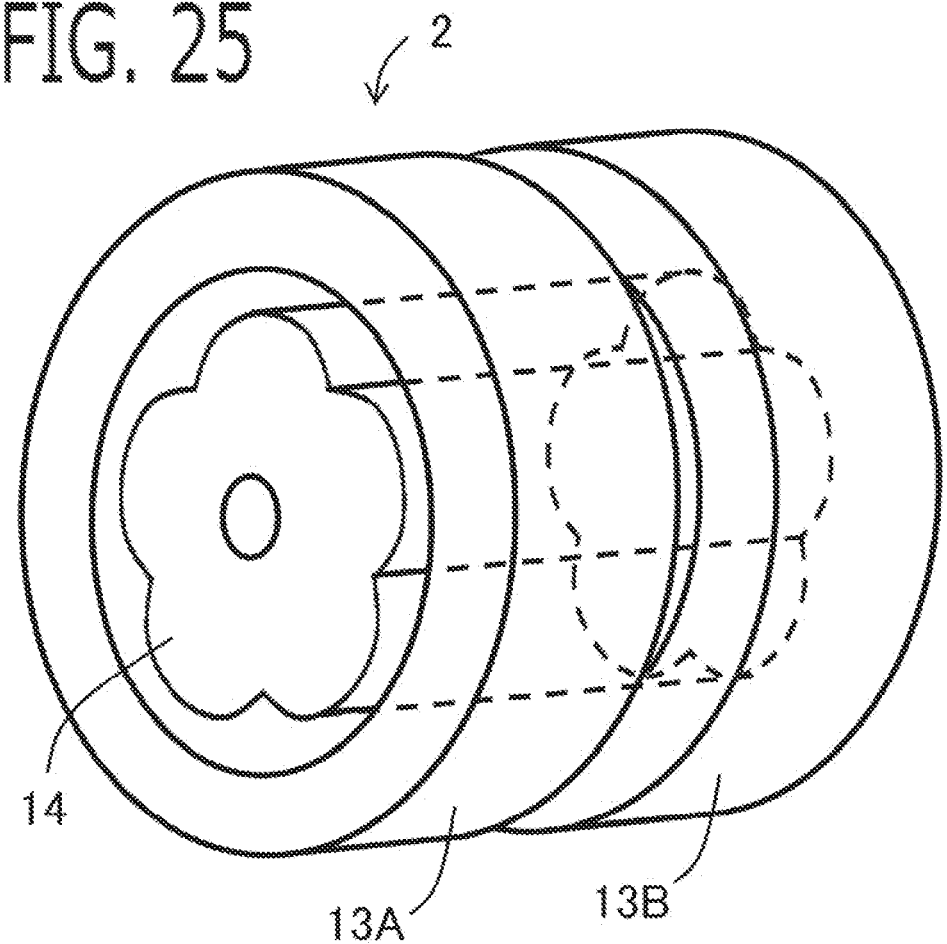

AC ROTARY MACHINE APPARATUS

CROSS REFERENCE TO RELATED APPLICATIONS

This application is a National Stage of International Application No. PCT/JP2019/037889 filed Sep. 26, 2019.

TECHNICAL FIELD

The present disclosure relates to an AC rotary machine apparatus.

BACKGROUND ART

In the elevator, the electric power steering apparatus, the electric vehicle, and the like, system which drives the duplicate three-phase motor provided with two systems of three-phase windings in one stator by two inverters has spread. As a reason that system has spread, the measure to enlargement of the apparatus and the fault tolerance (for example, continuity of system when failing one system) are mainly mentioned.

In PLT 1, the mutual communication is performed between the first system control circuit which performs driving control of the first system three-phase windings, and the second system control circuit which performs driving control of the second system three-phase windings, and the operation abnormality of the control circuit of the other is detected.

For example, with reference to FIG. 22 of PLT 1, dq-axis currents Id1, Iq1 outputted from the master side dq-axis current calculations 142, 143 are transmitted from the master side to the slave side, and the master side abnormality is monitored by the slave side abnormality monitor 290. And, dq-axis currents Id2, Iq2 outputted from the slave side dq-axis current calculations 242, 243 are transmitted from the slave side to the master side, and the slave side abnormality is monitored by the maste side abnormality monitor 190.

CITATION LIST

Patent Literature

PLT 1: WO 2018/088465 A

SUMMARY OF INVENTION

Technical Problem

According to the abnormality monitor by the abnormality monitoring units 190, 290 described in PLT 1 (FIG. 22 and the paragraph 0139), when the value inputted into their monitoring units is different from the normal time, it is determined as abnormal. However, there are two factors of "the operation abnormality of the control circuit of the other system" and "the communication abnormality of the mutual communication" as factor causing difference from the normal time, and it is undistinguishable either factor causes abnormality. Accordingly, in the case where the abnormal factor is "the communication abnormality of the mutual communication" and is not "the operation abnormality of the control circuit of the other system", it may be determined that it is abnormal and it may be switched to the control of the abnormal time.

Then, it is desired to provide an AC rotary machine apparatus which can determine the operation stop of the control circuit of the other system with good accuracy.

Solution to Problem

An AC rotary machine apparatus according to the present disclosure, including:

an AC rotary machine that is provided with first system plural-phase windings and second system plural-phase windings;

a first system inverter that is provided with plural switching devices for applying voltage to the first system plural-phase windings;

a second system inverter that is provided with plural switching devices for applying voltage to the second system plural-phase windings;

a resolver that is a sensor for detecting a rotational position of the AC rotary machine, and is provided with a first system excitation winding, first system two output windings, a second system excitation winding, and second system two output windings, in which a magnetic interference occurs between a first system and a second system;

a first system control circuit that applies AC voltage with a first period to the first system excitation winding, detects first system output signals outputted from the first system two output windings, calculates first system voltage commands for applying to the first system plural-phase windings, and turns on and off the plural switching devices of the first system inverter and applies voltage to the first system plural-phase windings, based on the first system voltage commands; and a second system control circuit that applies AC voltage with a second period which is different from the first period to the second system excitation winding, detects second system output signals outputted from the second system two output windings, detects a second system angle of the AC rotary machine based on components of the second period included in the second system output signals, calculates second system voltage commands for applying to the second system plural-phase windings based on the second system angle, and turns on and off the plural switching devices of the second system inverter and applies voltage to the second system plural-phase windings, based on the second system voltage commands, wherein the first system control circuit extracts components of the second period from the first system output signals, and determines whether operation of the second system control circuit stops based on the extracted components of the second period.

Advantage of Invention

According to the AC rotary machine apparatus of the present disclosure, when the operation abnormality occurs in the second system control circuit and the AC voltage with the second period is no longer applied to the second system excitation winding, the components of the second period which are generated in the first system output signals by the magnetic interference decreases. And, the second system control circuit cannot detect the second system angle of the AC rotary machine based on the components of the second period included in the second system output signals, cannot calculate the second system voltage commands applied to the second system plural-phase windings based on the second system angle, and cannot apply voltage to the second system plural-phase windings. Therefore, utilizing the magnetic interference of the resolver, based on the components of the second period extracted from the first system output signals, it can be determined with good accuracy whether the operation stop occurred in the second system control circuit.

BRIEF DESCRIPTION OF THE DRAWINGS

FIG. 22 is a flowchart for explaining processing of the first system abnormality determination unit according to Embodiment 1;

FIG. 23 is a flowchart for explaining processing of the second system current command value calculation unit according to Embodiment 1;

FIG. 24 is a schematic configuration diagram of the electric power steering apparatus according to Embodiment 2; and FIG. 25 is a schematic perspective view of the resolver according to other embodiments.

DETAILED DESCRIPTION OF THE EMBODIMENTS

1. Embodiment 1

Figure 1:
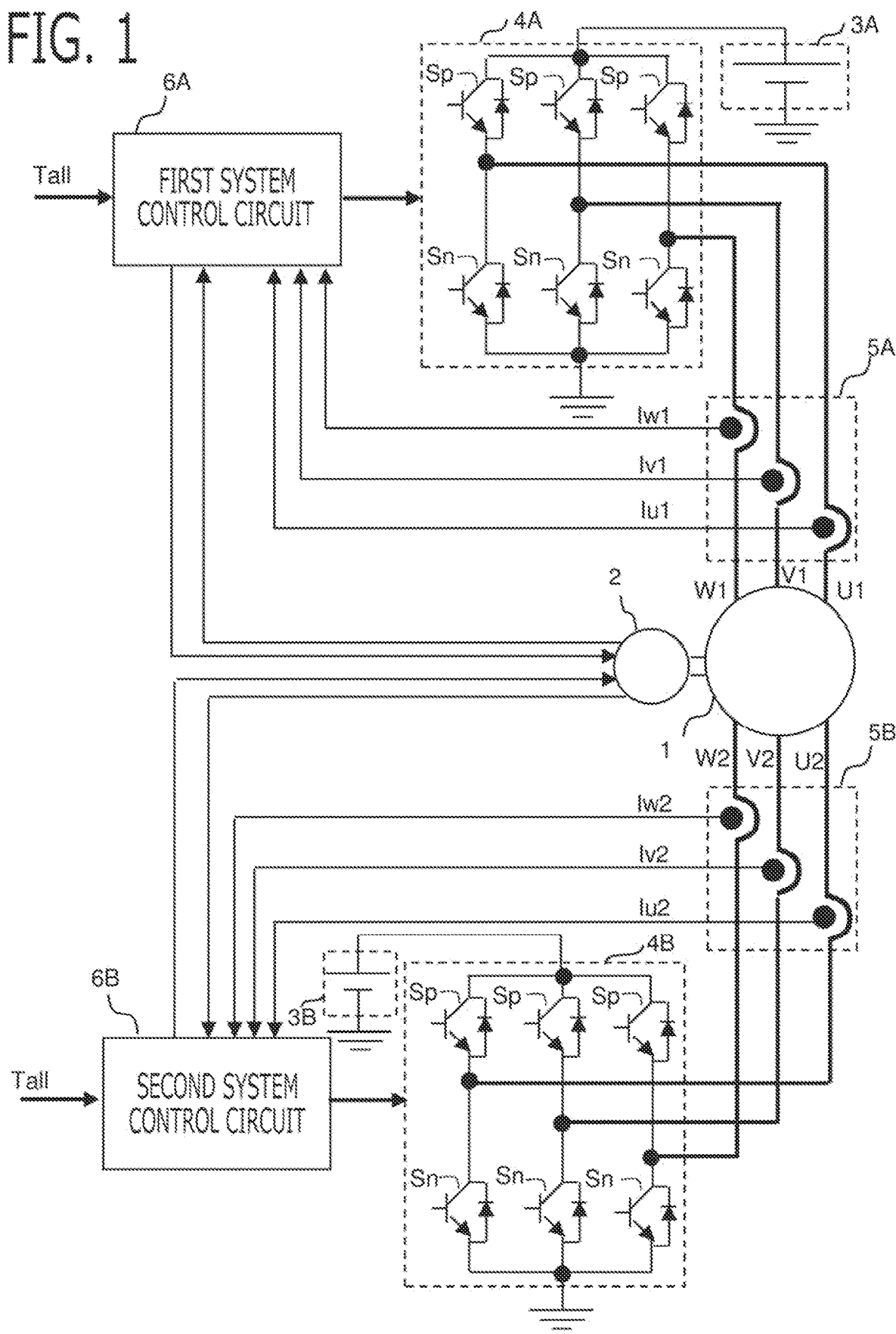
FIG. 1 is a schematic configuration diagram of the AC rotary machine apparatus according to Embodiment 1.

The AC rotary machine apparatus according to Embodiment 1 will be explained with reference to drawings. FIG. 1 is a schematic configuration diagram of the AC rotary machine apparatus according to the present embodiment. The AC rotary machine apparatus is provided with an AC rotary machine 1, a resolver 2, a first system inverter 4A, a second system inverter 4B, a first system control circuit 6A, a second system control circuit 6B, and the like.

1-1. AC Rotary Machine 1

Figure 2:
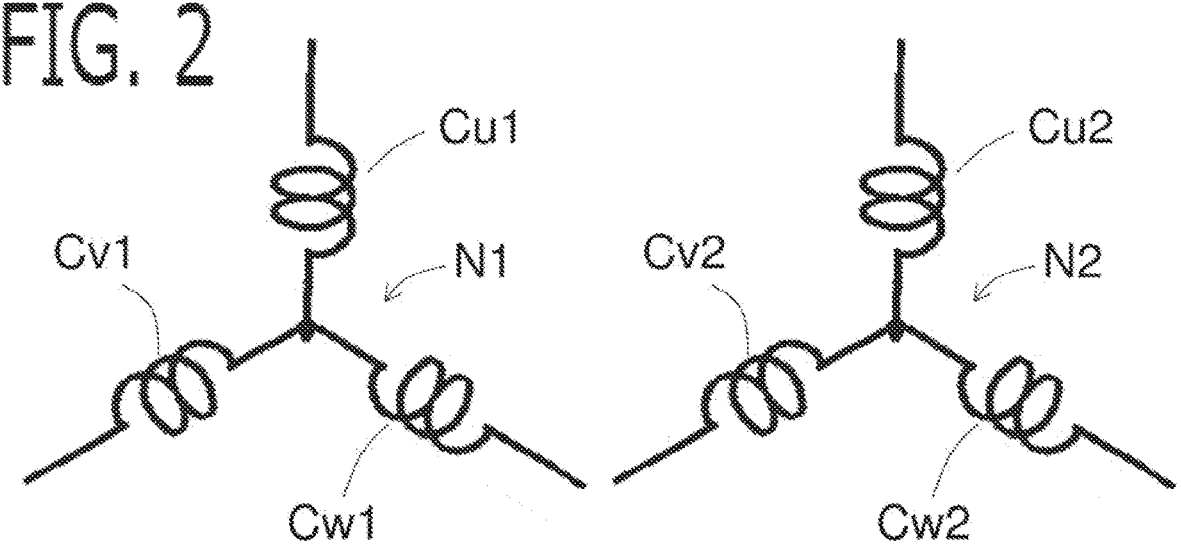
FIG. 2 is a schematic diagram of the first system three-phase windings and the second system three-phase windings according to Embodiment 1.

The AC rotary machine 1 is provided with a first system plural-phase windings N1 (in this example, three-phase) and a second system plural-phase windings N2 (in this example, three-phase). As shown in FIG. 2, the first system three-phase windings N1 are a winding Cu1 of U1 phase, a winding Cv1 of V1 phase, and a winding Cw1 of W1 phase, and the second system three-phase windings N2 are a winding Cu2 of U2 phase, a winding Cv2 of V2 phase, and a winding Cw2 of W2 phase. In the example of FIG. 2, although the first system and the second system three-phase windings N1, N2 are Y connection, or these may be Δ connection. The first system and the second system three-phase windings N1, N2 are wound around one stator. A phase difference may be provided between the first system three-phase windings N1 and the second system three-phase windings N2 (for example, 30+60×H degrees (H is an integer) in the electrical angle).

The rotor is provided on the radial-direction inner side of the stator. The AC rotary machine 1 may be a permanent magnet synchronous rotary machine in which the permanent magnet is provided in the rotor, may be a winding field synchronous rotary machine in which the electromagnet is provided in the rotor, or may be an induction rotary machine or synchronous reluctance rotary machine in which the magnet is not provided in the rotor. In the example explained in the following, the permanent magnet is provided in the rotor.

1-2. Resolver 2

Figure 3:
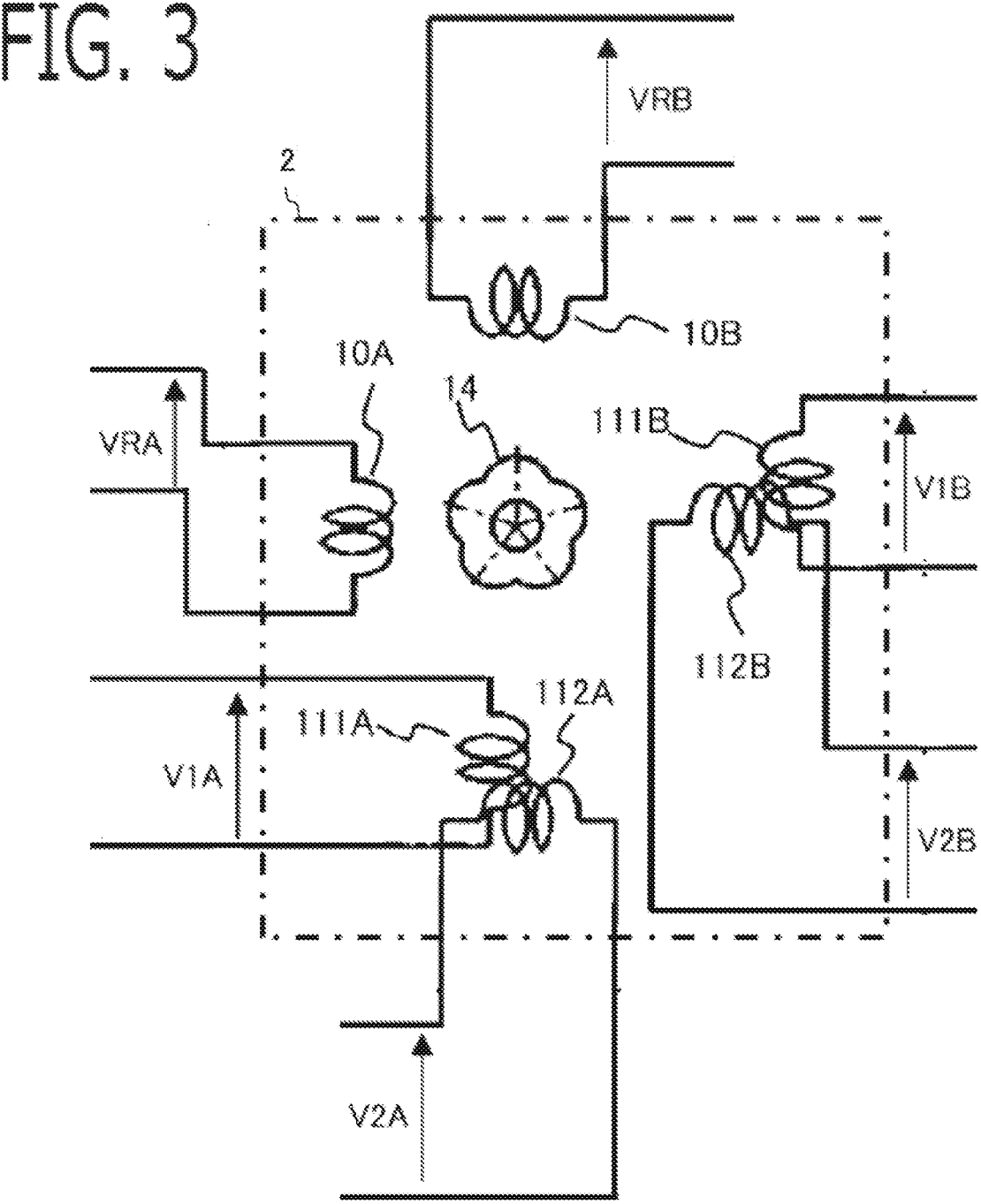
FIG. 3 is a schematic diagram of the resolver according to Embodiment 1.

The resolver 2 is a sensor for detecting a rotational position of the rotor of the AC rotary machine 1. As shown in FIG. 3, the resolver 2 is provided with a first system excitation winding 10A, first system two output windings 111A, 112A (referred to also as a first output winding 111A and a second output winding 112A), a second system excitation winding 10B, and second system two output windings 111B, 112B (referred to also as a third output winding 111B and a fourth output winding 112B). A magnetic interference occurs between the first system windings 10A, 111A, 112A and the second system windings 10B, 111B, 112B. That is to say, by the magnetic flux generated by the first system excitation winding 10A, an induced voltage is generated not only in the first system two output windings 111A, 112A, but also in the second system two output windings 111B, 112B; and by the magnetic flux generated by the second system excitation winding 10B, an induced voltage is generated not only in the second system two output windings 111B, 112B, but also in the first system two output windings 111A, 112A.

Figure 4:
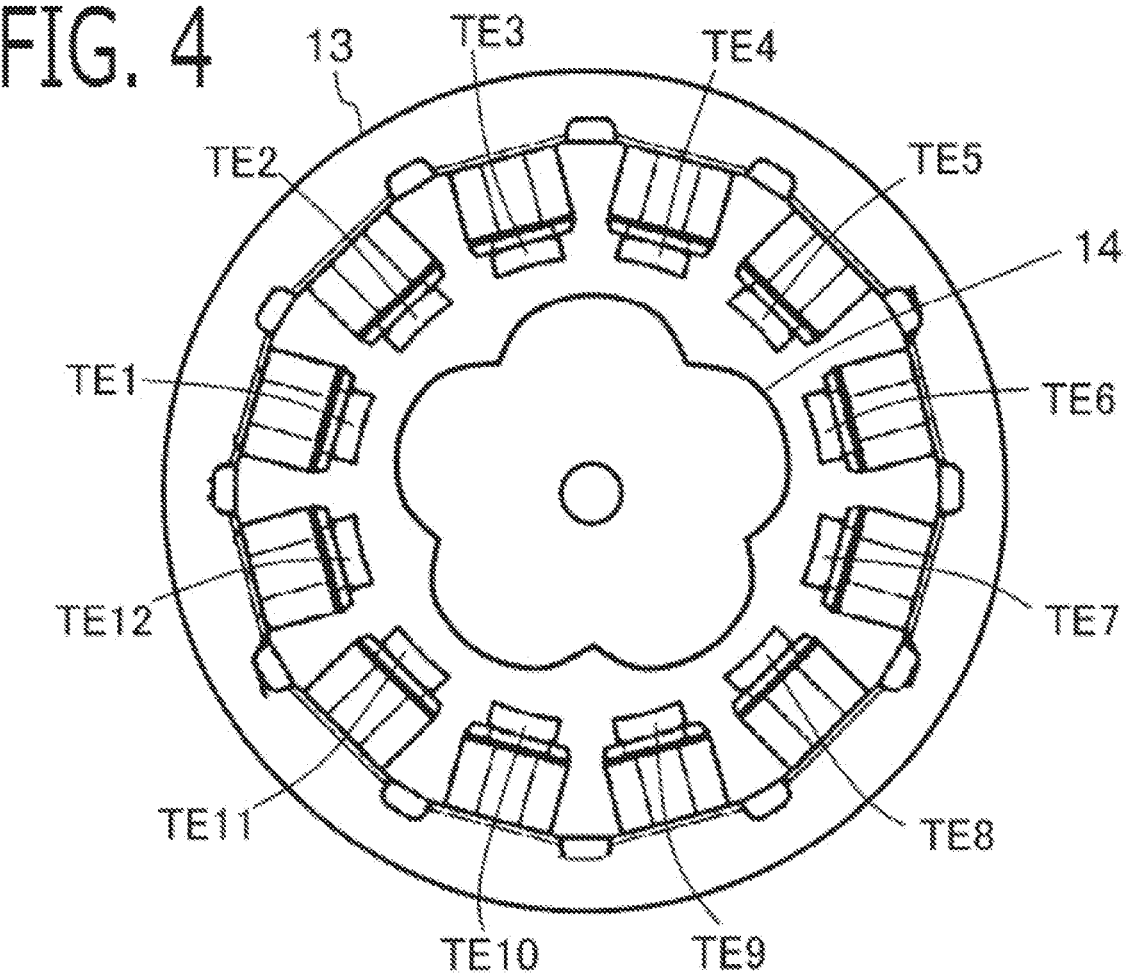
FIG. 4 is a side view of the resolver viewed in the axial direction according to Embodiment 1.

As shown in FIG. 4, the first system excitation winding 10A, the first system two output windings 111A, 112A, the second system excitation winding 10B, and the second system two output windings 111B, 112B are wound around the same one resolver stator 13. The resolver stator 13 is provided with 12 teeth TE1 to TE12 arranged equally in the circumferential direction. The resolver rotor 14 is arranged on the radial-direction inner side of the resolver stator 13. The resolver rotor 14 is attached to the rotation axis of the rotor so as to rotate integrally with the rotor of the AC rotary machine 1. The resolver rotor 14 is provided with a plurality of projection parts which are arranged equally in the circumferential direction on the peripheral part of the rotor. The projection height to the radial-direction outside of the projection parts is formed so that the gap permeance between the resolver stator 13 and the resolver rotor 14 changes in sine wave shape according to rotation. That is to say, the resolver 2 is a variable reluctance (VR) type resolver. In the present embodiment, the five projection parts are provided, and the axial double angle is 5. Therefore, whenever the rotor rotates once in the mechanical angle, rotates 5 times in the electrical angle.

Figure 5:
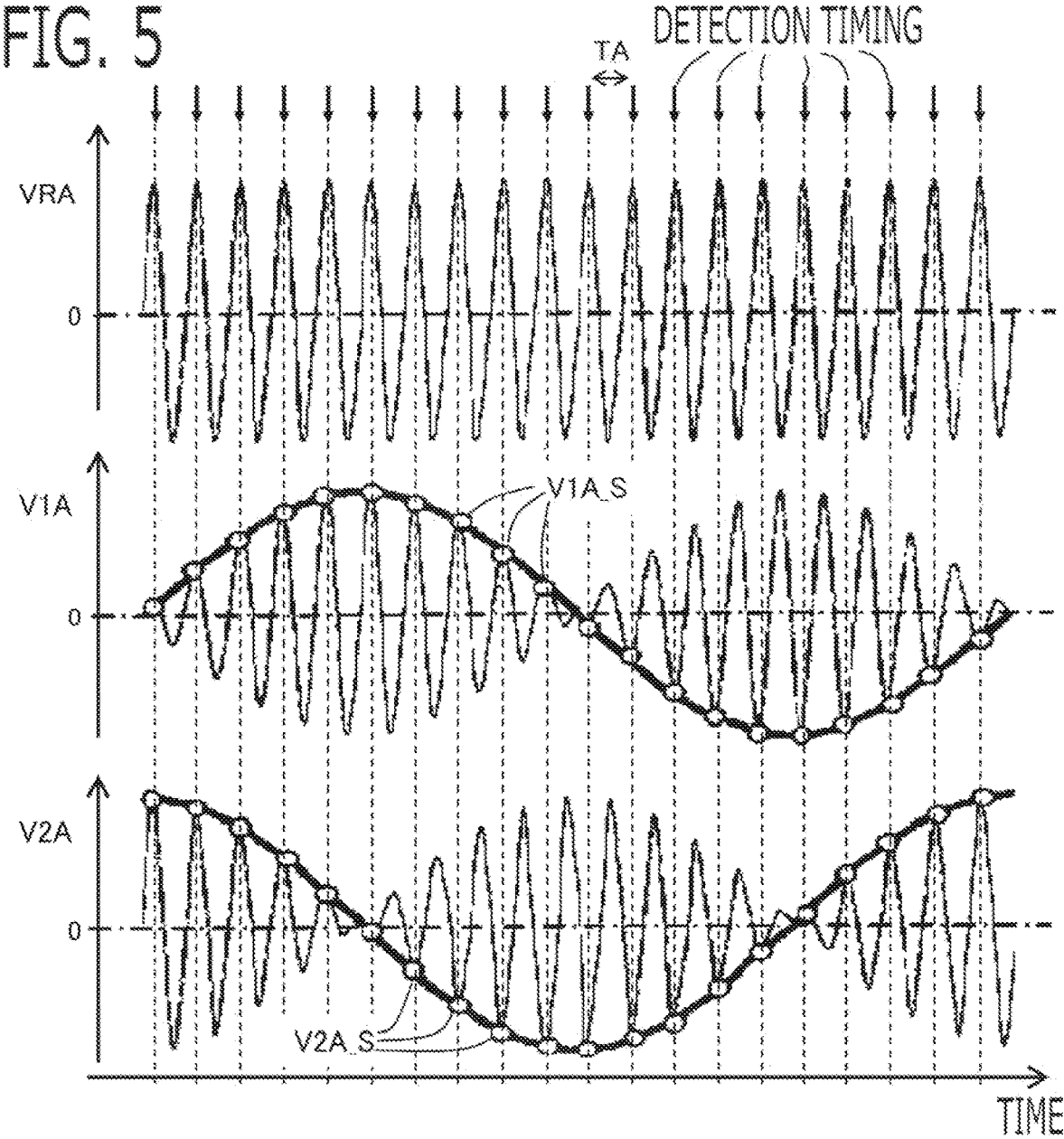
FIG. 5 is a time chart for explaining the first system detection timing according to Embodiment 1.

As showing an example supposed that there is no magnetic interference between two systems in FIG. 5, when the rotor rotates in the state where the AC voltage VRA is applied to the first system excitation winding 10A, the amplitude of AC voltage V1A induced in the first system first output winding 111A and the amplitude of AC voltage V2A induced in the first system second output winding 112A change in a sine wave shape (or in a cosine wave shape), according to the rotational angle (the gap permeance) in the electrical angle of the rotor. The first system first output winding 111A and the first system second output winding 112A are wound around the positions of the circumferential direction of the resolver stator 13 so that the amplitudes of those AC voltages are mutually different 90 degrees in the electrical angle. Similarly, the second system third output winding 111B and the second system fourth output winding 112B are wound around the positions of the circumferential direction of the resolver stator 13 so that the amplitudes of those induced AC voltages are mutually different 90 degrees in the electrical angle.

The first system excitation winding 10A wound around the plurality of teeth is connected in series between teeth; and the two terminals of the first system excitation winding 10A connected in series are connected to the first system control circuit 6A described below. Similarly, the two terminals of the first system first output winding 111A connected in series between teeth are connected to the first system control circuit 6A. The two terminals of the first system second output winding 112A connected in series between teeth are connected to the first system control circuit 6A. The two terminals of the second system excitation winding 10B connected in series are connected to the second system control circuit 6B described below. Similarly, the two terminals of the second system third output winding 111B connected in series between teeth are connected to the second system control circuit 6B. The two terminals of the second system fourth output winding 112B connected in series between teeth are connected to the second system control circuit 6B.

The number of projection parts (axial double angle) and the number of teeth may be set to any numbers. The first system windings and the second system windings may not be arranged being divided into two in the circumferential direction, but may be arranged being distributed in the circumferential direction.

1-3. First System Inverter 4A

The first system inverter 4A is provided with plural switching devices for applying voltage to the first system three-phase windings N1. The first system inverter 4A converts between DC power of the first system DC power source 3A and AC power supplied to the first system three-phase windings N1.

The first system inverter 4A is provided with three sets of a series circuit where a positive electrode side switching device Sp connected to the positive electrode terminal of the first system DC power source 3A and a negative electrode side switching device Sn connected to the negative electrode terminal of the first system DC power source 3A are connected in series, corresponding to respective phase of the three phase windings. A connection node of two switching devices in each series circuit is connected to the winding of the corresponding phase. IGBT (Insulated Gate Bipolar Transistor) in which a diode is connected in inverse parallel, a bipolar transistor in which a diode is connected in inverse parallel, MOSFET (Metal Oxide Semiconductor Field Effect Transistor), or the like is used for the switching device. A gate terminal of each switching device is connected to the first system control circuit 6A via a gate drive circuit and the like. The each switching device is turned on or turned off by the switching signal outputted from the first system control circuit 6A.

The first system inverter 4A is provided with a first system current sensor 5A for detecting current which flows into each phase winding of first system. The first system current sensor 5A may be a Hall element or the like provided on the wire which connects the series circuit of the switching devices of each phase and the armature winding. The first system current sensor 5A may be a shunt resistance connected in series to the series circuit of the switching devices of each phase.

The first system DC power source 3A outputs DC voltage to the first system inverter 4A. As the first system DC power source 3A, any apparatus which outputs DC voltage, such as a battery, a DC-DC converter, a diode rectifier, and a PWM rectifier, is used.

1-4. Second System Inverter 4B

The second system inverter 4B is provided with plural switching devices for applying voltage to the second system three-phase windings N2. The second system inverter 4B converts between DC power of the second system DC power source 3B, and AC power supplied to the second system three-phase windings N2.

The second system inverter 4B is provided with three sets of a series circuit where a positive electrode side switching device Sp connected to the positive electrode terminal of the second system DC power source 3B and a negative electrode side switching device Sn connected to the negative electrode terminal of the second system DC power source 3B are connected in series, corresponding to respective phase of the three phase windings. A connection node of two switching devices in each series circuit is connected to the winding of the corresponding phase. A gate terminal of each switching device is connected to the second system control circuit 6B via a gate drive circuit and the like. The each switching device is turned on or turned off by the switching signal outputted from the second system control circuit 6B.

The second system inverter 4B is provided with a second system current sensor 5B for detecting current which flows into each phase winding of second system. The second system current sensor 5B may be a Hall element or the like provided on the wire which connects the series circuit of the switching devices of each phase and the armature winding. The second system current sensor 5B may be a shunt resistance connected in series to the series circuit of the switching devices of each phase.

The second system DC power source 3B outputs DC voltage to the second system inverter 4B. As the second system DC power source 3B, any apparatus which outputs DC voltage, such as a battery, a DC-DC converter, a diode rectifier, and a PWM rectifier, is used. The first system DC power source 3A and the second system DC power source 3B may be the same one.

1-5. First System Control Circuit 6A

Figure 6:
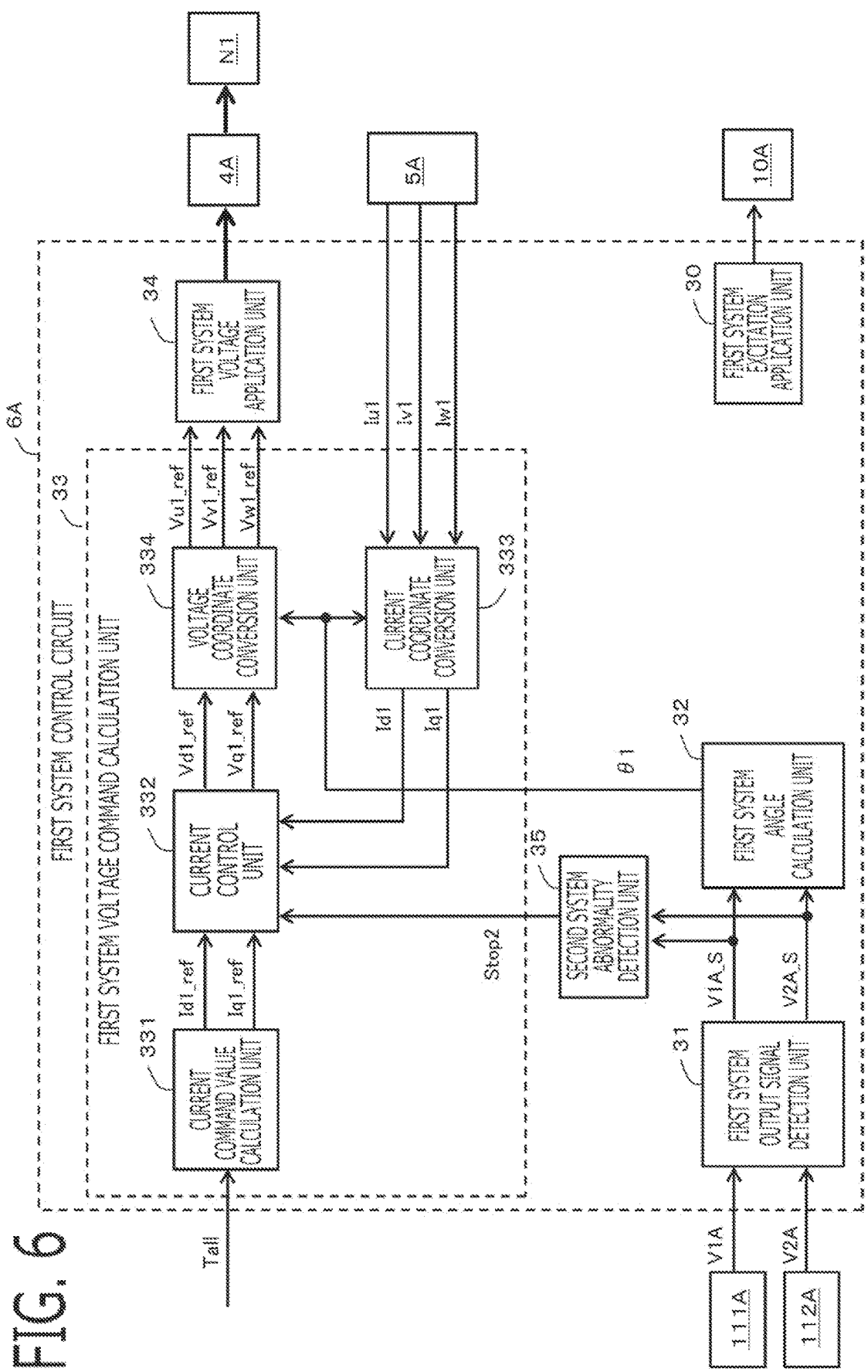
FIG. 6 is a block diagram of the first system control circuit according to Embodiment 1.

As shown in FIG. 6, the first system control circuit 6A is provided with functional units of a first system excitation application unit 30, a first system output signal detection unit 31, a first system angle calculation unit 32, a first system voltage command calculation unit 33, a first system voltage application unit 34, a second system abnormality detection unit 35, and the like.

Figure 7:
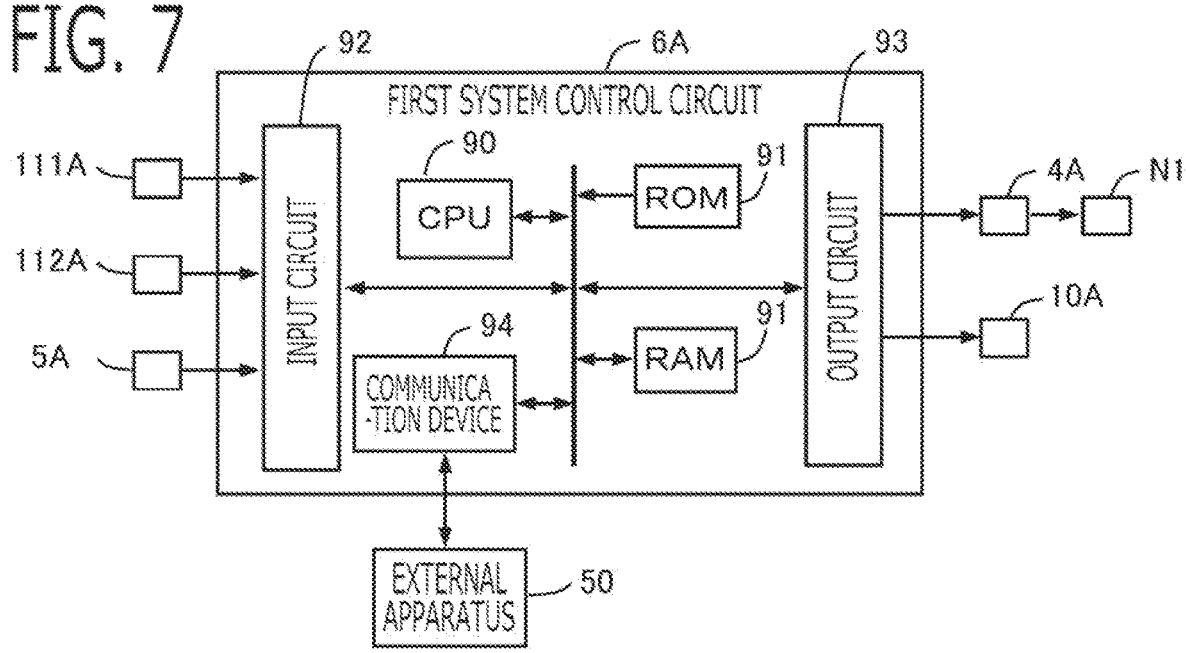
FIG. 7 is a hardware configuration diagram of the first system control circuit according to Embodiment 1.

Respective functional units 30 to 35 and the like provided in the first system control circuit 6A are realized by processing circuits included in the first system control circuit 6A. Specifically, as shown in FIG. 7, the first system control circuit 6A is provided with, as processing circuits, an arithmetic processor (computer) 90 such as a CPU (Central Processing Unit), storage apparatuses 91 which exchange data with the arithmetic processor 90, an input circuit 92 which inputs external signals to the arithmetic processor 90, an output circuit 93 which outputs signals from the arithmetic processor 90 to the outside, a communication device 94 which performs data communication with the external apparatus 50, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatus 91, RAM (Random Access Memory), ROM (Read Only Memory), and the like are provided.

Various kinds of sensors, such as the first system first output winding 111A, the second output winding 112A, and the first system current sensor 5A, are connected to the input circuit 92. The input circuit 92 is provided with an A/D converter which inputs the output voltage of each output winding and the output signal of sensor into the arithmetic processor 90. The output circuit 93 is connected to the first system excitation winding 10A, and is provided with driving circuits, such as a switching device for applying AC voltage VRA to this excitation winding. The output circuit 93 is connected with electric loads such as a gate drive circuit which drives on and off of the switching devices of the first system inverter 4A, and is provided with driving circuit and the like for outputting a control signal from the arithmetic processor 90. The communication device 94 communicates with the external apparatus 50.

Then, the computing processing unit 90 runs software items (programs) stored in the storage apparatus 91 such as a ROM and collaborates with other hardware devices in the first system control circuit 6A, such as the storage apparatus 91, the input circuit 92, the output circuit 93, and the communication device 94, so that the respective functions of the functional units 30 to 35 included in the first system control circuit 6A are realized. Setting data items, such as the first period, the first system removal processing interval, the second period extraction processing interval, and the determination threshold, to be utilized in the functional units 30 to 35 are stored, as part of software items (programs), in the storage apparatus 91 such as a ROM.

1-5-1. First System Angle Detection Processing

<First System Excitation Application Unit 30>

The first system excitation application unit 30 applies an AC voltage VRA with the first period TA to the first system excitation winding 10A. The first system excitation application unit 30 may generate a rectangular wave signal of the first period TA by the driving circuit and output binary voltages of a High level (for example, 5V) and a Low level (for example, 0V) alternately, this output may be inputted into a lowpass filter circuit, and an output of the lowpass filter circuit may be applied to the first system excitation winding 10A as the AC voltage VRA.

<First System Output Signal Detection Unit 31>

The first system output signal detection unit 31 detects periodically the output signals V1A, V2A of the first system two output windings 111A, 112A at preliminarily set detection timing (hereinafter, referred to also as the first system detection timing).

In the present embodiment, the first system output signal detection unit 31 detects the output signals V1A, V2A of the first system two output windings at a timing when the AC voltage VRA with the first period TA applied to the first system excitation winding 10A becomes the maximum value or the minimum value (in this example, the maximum value). That is to say, the first system detection timing is set to the timing at every first period TA.

<First System Angle Calculation Unit 32>

Figure 8:
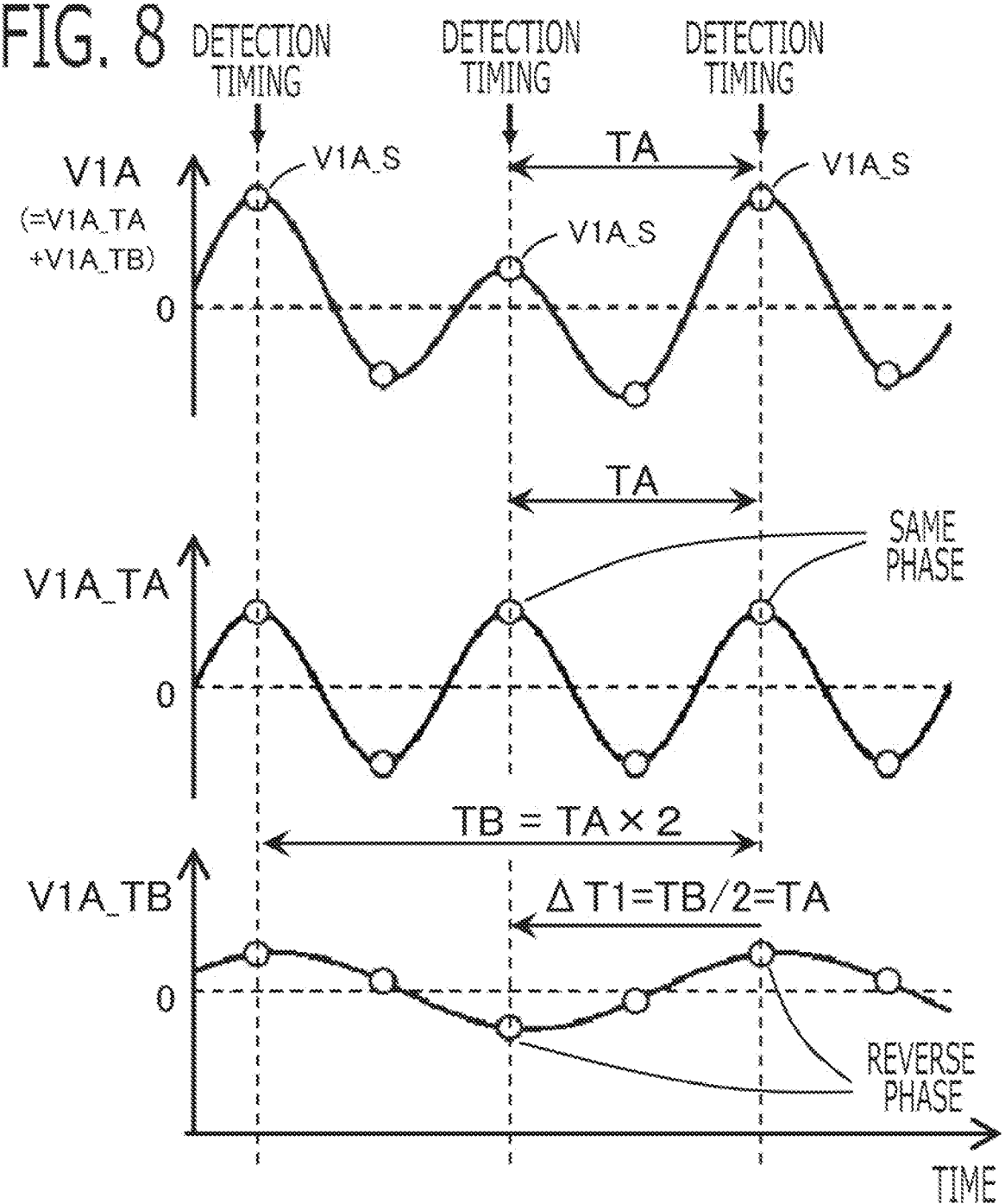
FIG. 8 is a time chart for explaining processing of the first system according to Embodiment 1.

As showing an example of the output signal V1A of the first output winding 111A in FIG. 8, the components V1A_TB, V2A_TB of the second period induced by the magnetic flux of the second period TB excited in the second system excitation winding 10B are superimposed on each of the output signals V1A, V2A of the first system two output windings 111A, 112A, due to the magnetic interference between systems. The output signal V1A of the first output winding 111A is shown in the upper row graph of FIG. 8; the component V1A_TA of the first period induced by the magnetic flux of the first system excitation winding 10A included in the output signal V1A of the first output winding 111A is shown in the middle graph; and the component V1A_TB of the second period induced by the magnetic flux of the second system excitation winding 10B included in the output signal V1A of the first output winding 111A is shown in the lower row graph. The output signal V1A of the first output winding 111A becomes a signal obtained by totaling the component V1A_TA of the first period and the component V1A_TB of the second period. In the present embodiment, the first period TA is set smaller than the second period TB.

Figure 9:
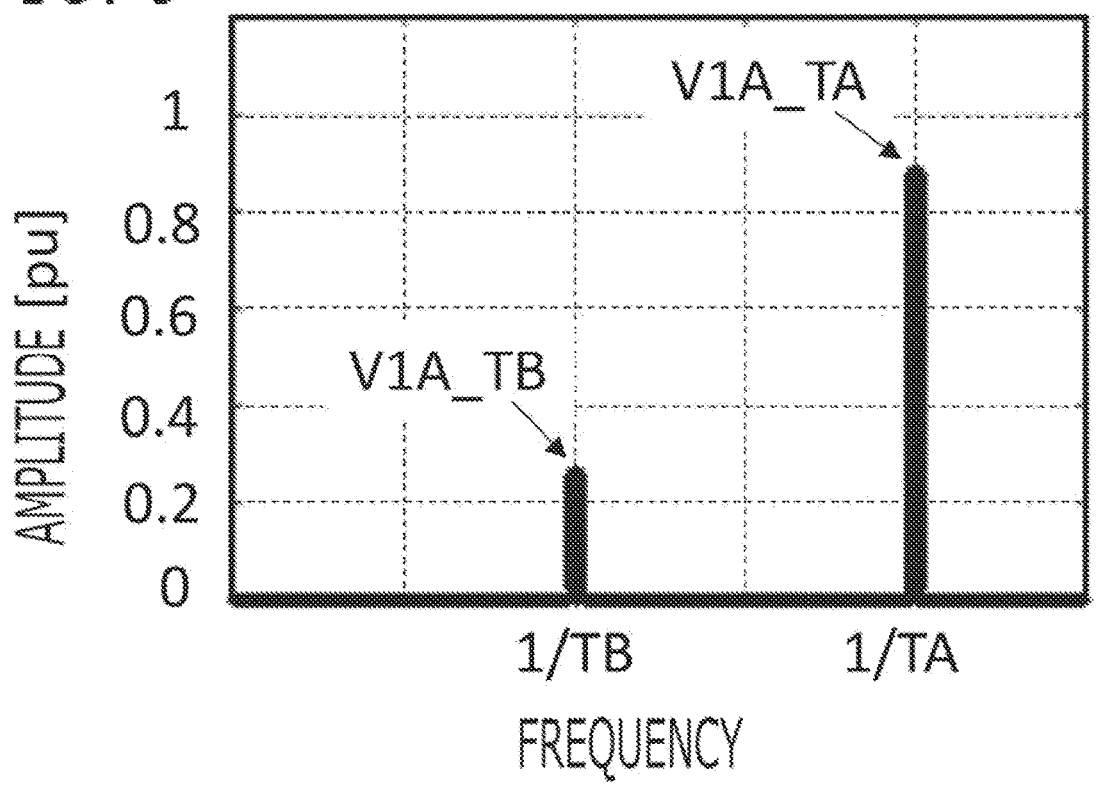
FIG. 9 is a figure for explaining processing of the first system according to Embodiment 1.
Figure 10:
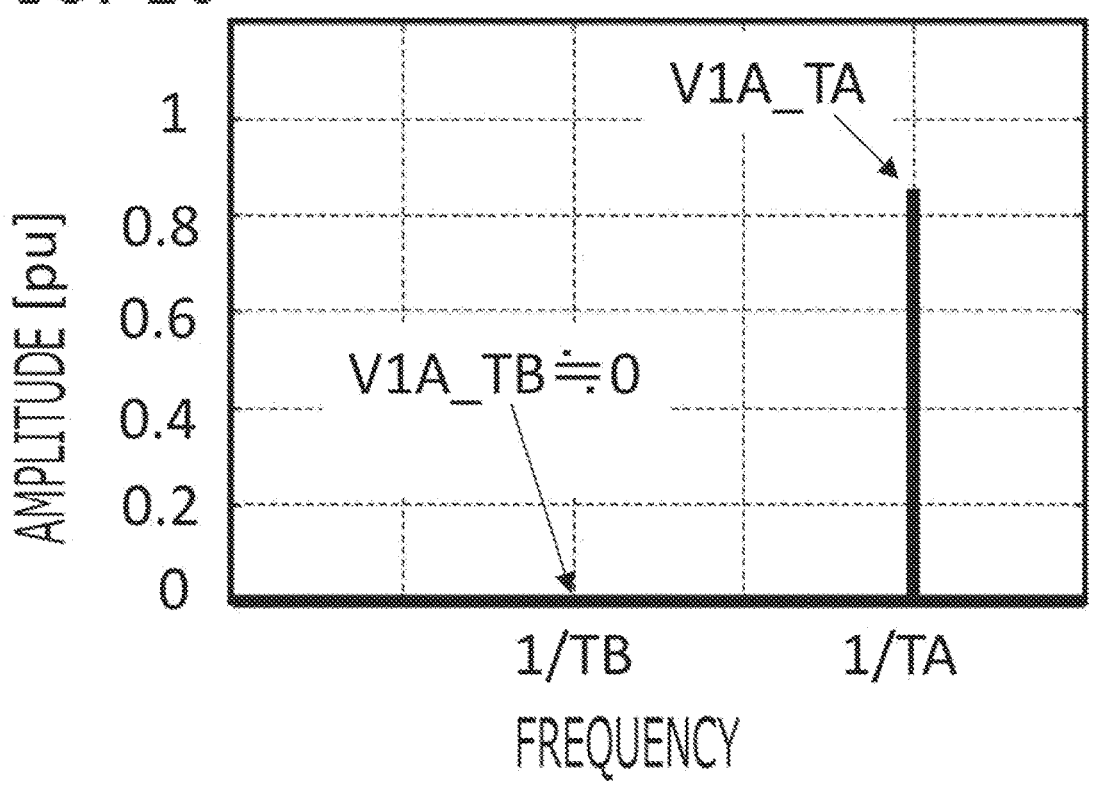
FIG. 10 is a figure for explaining processing of the first system according to Embodiment 1.

Herein, the frequency analysis result of measured value of the output signal V1A of the first output winding is shown in FIG. 9 and FIG. 10. The example of FIG. 9 is a case where the AC voltage VRB with the second period TB is applied to the second system excitation winding 10B, and the example of FIG. 10 is a case where the AC voltage VRB with the second period TB is not applied to the second system excitation winding 10B. As the measurement test condition, it is set to TA-50 µs and TB-100 µs. The horizontal axis of FIG. 9 and FIG. 10 is a frequency, and the vertical axis is an amplitude of the output signal.

In the example of FIG. 9, the component V1A_TB of the second period resulting from the AC voltage with the second period TB applied to the second system excitation winding 10B is superimposed on the output signal V1A of the first output winding, as the interference voltage, in addition to the component V1A_TA of the first period resulting from the AC voltage with first period TA applied to the first system excitation winding 10A. In the example of FIG. 10, the component V1A_TA of the first period is superimposed on the output signal V1A of the first output winding, and the component V1A_TB of the second period is not superimposed on it. The same applies to the output signal V2A of the second output winding.

Accordingly, if the angle is calculated based on the output signal V1A of the first output winding and the output signal V2A of the second output winding on which the components V1A_TB, V2A_TB of the second period are superimposed, the detection error will occur. Therefore, in order to suppress the detection error of the angle, it is necessary to remove the components V1A_TB, V2A_TB of the second period from the output signal V1A of the first output winding and the output signal V2A of the second output winding.

Then, the first system angle calculation unit 32 is provided with a first system removal processing unit 321 and a first system angle after removal processing calculation unit. Then, the first system removal processing unit 321 performs a second period component removal processing which removes (decreases) the component of the second period, to the detection values V1A_S, V2A_S of the output signals of the first system two output windings. Then, the first system angle after removal processing calculation unit calculates a first system angle θ1 based on the detection values V1A_F, V2A_F of the output signals of the first system two output windings after the second period component removal processing.

In the present embodiment, based on the principle explained in the following, the second period component removal processing is performed. As shown in the lower row graph of FIG. 8, in the component V1A_TB of the second period of the output signal of the first output winding, the phase is reversed and the sign of plus or minus is reversed in a period obtained by adding an integral multiple of the second period TB to a half period TB/2 of the second period (for example, half period TB/2 of the second period).

Then, as the second period component removal processing, the first system removal processing unit 321 adds the detection values V1A_S, V2A_S of the output signals of the first system two output windings detected at this time detection timing, and the detection values V1A_Sold, V2A_Sold of the output signals of the first system two output windings detected at a detection timing before a first system removal processing interval ΔT1 from this time detection timing. The first system removal processing interval ΔT1 is set as shown in the next equation. Herein, M is an integer greater than or equal to 0. In the present embodiment, M is set to 0, and the first system removal processing interval ΔT1 is set to the half period TB/2 of the second period.

$$\Delta T1 = TB/2 + TB \times M \quad (1)$$

In the present embodiment, the second period TB is set to an even multiple of the first period TA, as shown in the next equation. Herein, N is an integer greater than or equal to 1. In the present embodiment, N is set to 1, and the second period TB is set to a twice of the first period TA.

$$TB = TA \cdot 2 \times N \quad (2)$$

According to this setting, as shown in the next equation in which the equation (2) is substituted in the equation (1), the first system removal processing interval ΔT1 becomes an integral multiple of the first period TA.

$$\Delta T1 = TA \times (N + 2 \times N \times M) \quad (3)$$

Therefore, among the detection values V1A_S, V2A_S of the output signals of first system two output windings, values before and after the integral multiple of the first period TA are added. Then, as shown in FIG. 8, since the added two components of the first period have the same phase and become the equivalent values with the same sign of plus or minus, the detection values V1A_F, V2A_F of the output signals of the first system two output windings after addition correspond to the double values of the components of the first period V1A_TA, V2A_TA included in the detection values, respectively.

$$V1A\_F \approx 2 \times V1A\_TA$$

$$V2A\_F \approx 2 \times V2A\_TA \quad (4)$$

Figure 11:
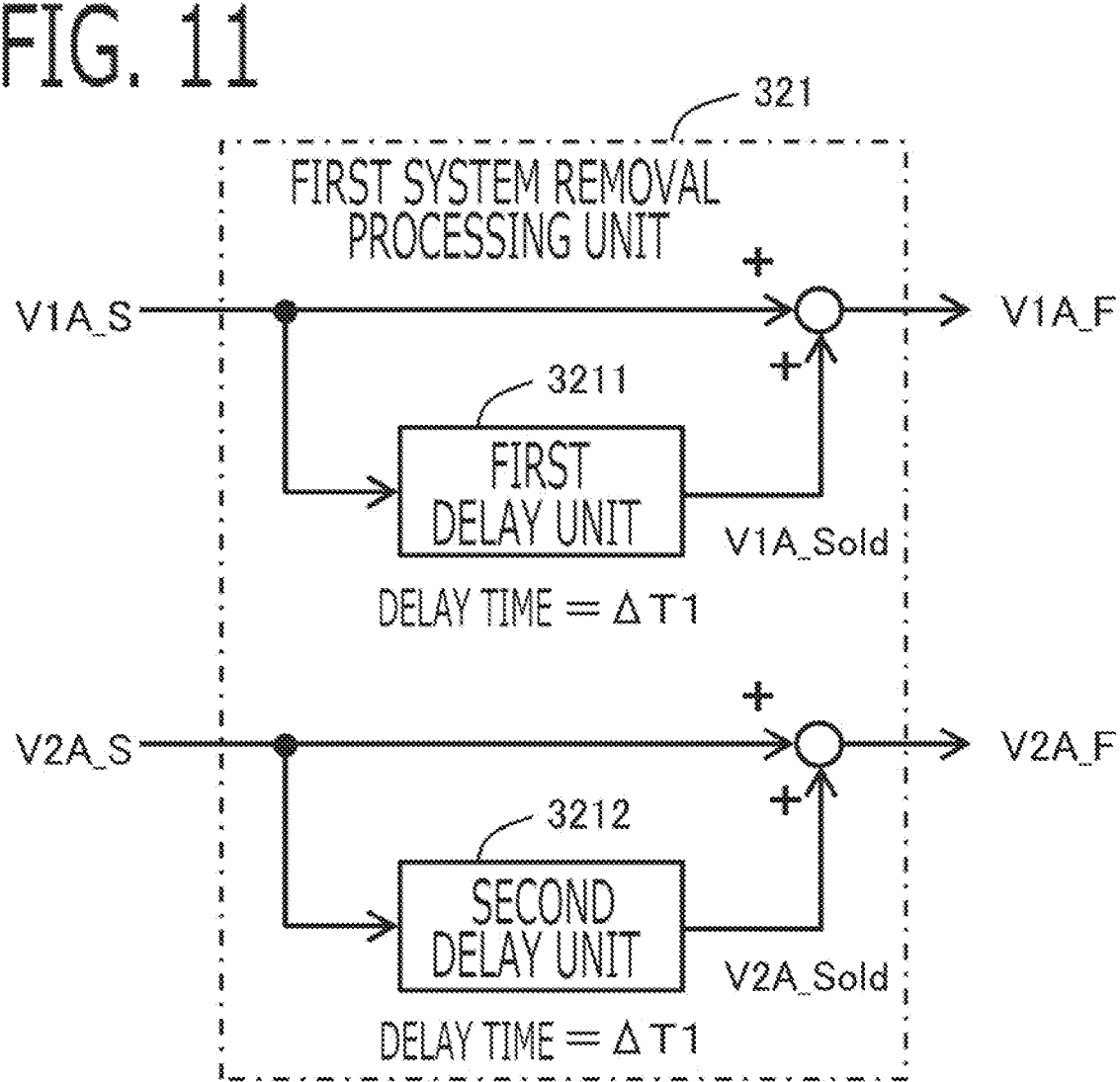
FIG. 11 is a block diagram of the first system removal processing unit according to Embodiment 1.

The first system removal processing unit 321 is constituted, for example, as shown in FIG. 11. The first system removal processing unit 321 is provided with a first delay unit 3211 which delays the detection value V1A_S of the output signal of the first output winding by the first system removal processing interval ΔT1, and outputs; adds the detection value V1A_S of the output signal of the first output winding, and the output V1A_Sold of the first delay unit 3211; and calculates the detection value V1A_F of the output signal of the first output winding after the second period component removal processing. Similarly, the first system removal processing unit 321 is provided with a second delay unit 3212 which delays the detection value V2A_S of the output signal of the second output winding by the first system removal processing interval ΔT1, and outputs; adds the detection value V2A_S of the output signal of the second output winding, and the output V2A_Sold of the second delay unit 3212; and calculates the detection value V2A_F of the output signal of the second output winding after the second period component removal processing.

Then, the first system angle after removal processing calculation unit calculates the first system angle θ1 based on the detection values V1A_, V2A_F of the output signals of the first system two output windings after addition.

According to this configuration, the two components of the second period whose the signs of plus or minus are reversed with each other are added, and the two components of the second period are canceled with each other. Accordingly, in the detection values V1A_F, V2A_F of the output signals of the first system two output windings after addition, the component of the second period is removed. Then, based on the detection values after removing the component of the second period, the first system angle θ1 can be calculated with good accuracy.

In the present embodiment, as shown in the next equation, the first system angle after removal processing calculation unit calculates the first system angle θ1 by calculating an arc tangent (an arc tangent function) of a ratio between the detection value V1A_F of the output signal of the first output winding and the detection value V2A_F of the output signal of the second output winding after the second period component removal processing. An angular speed is also calculated based on the first system angle θ1.

$$\theta1 = \tan^{-1}(V1A\_F/V2A\_F) \quad (5)$$

1-5-2. First System Voltage Application Processing

The first system voltage command calculation unit 33 calculates first system three-phase voltage commands Vu1_ref, Vv1_ref, Vw1_ref applied to the first system three-phase windings N1, based on the first system angle θ1. Then, the first system voltage application unit 34 turns on and off the plural switching devices of the first system inverter 4A based on the first system three-phase voltage commands Vu1_ref, Vv1_ref, Vw1_ref, and applies voltage to the first system three-phase windings N1.

In the present embodiment, by a current feedback control on the dq-axis rotating coordinate system rotated synchronizing with the first system angle θ1, the first system three-phase voltage commands Vu1_ref, Vv1_ref, Vw1_ref are calculated. The first system voltage command calculation unit 33 is provided with a current command value calculation unit 331, a current control unit 332, a current coordinate conversion unit 333, and a voltage coordinate conversion unit 334.

The dq-axis rotating coordinate is a rotating coordinate which consists of a d-axis defined in a magnetic flux direction of the rotor and a q-axis defined in a direction advanced to the d-axis by n/2 in the electrical angle. In the present embodiment, the magnetic flux direction of the rotor is a direction of the N pole of the permanent magnet provided in the rotor.

As shown in FIG. 6, the current command value calculation unit 331 calculates a d-axis current command Id1_ref and a q-axis current command Iq1_ref. When determining by the second system abnormality detection unit 35 described below that the operation of the second system control circuit 6B does not stop, the current command value calculation unit 331 calculates a first system torque command T1 by multiplying a first system sharing rate of normal time to a torque command Tall for making the AC rotary machine output. The first system sharing rate of normal time is set to a value smaller than 1 (for example, 0.5). The current command value calculation unit 331 calculates first system dq-axis current commands Id1_ref, Iq1_ref according to a current vector control method, such as the maximum torque/current control, the magnetic flux weakening control, or the Id-0 control, based on the first system torque command T1, the power source voltage, the angular speed, and the like. In the present embodiment, the torque command Tall is transmitted from the external apparatus 50. The torque command Tall may be a first system torque command of normal time after sharing. The torque command Tall may be a q-axis current command of the Id=0 control. The torque command Tall may be calculated in the current command value calculation unit 331.

The current coordinate conversion unit 333 converts current detection values Iu1, Iv1, Iw1 which flow into the first system winding of each phase detected by the first system current sensor 5A into a first system d-axis current detection value Id1 and a first system q-axis current detection value Iq1 which are expressed on the dq-axis rotating coordinate system, by performing a three-phase/two-phase conversion and a rotating coordinate conversion based on the first system angle θ1.

The current control unit 332 performs a feedback control which changes a first system d-axis voltage command Vd1_ref and a first system q-axis voltage command Vq1_ref by PI control and the like so that the first system d-axis current detection value Id1 and the first system q-axis current detection value Iq1 approach the first system d-axis current command Id1_ref and the first system q-axis current command Iq1_ref.

The voltage coordinate conversion unit 334 converts the first system d-axis voltage command Vd1_ref and the first system q-axis voltage command Vq1_ref into the first system three-phase voltage commands Vu1_ref, Vv1_ref, Vw1_ref, by performing a fixed coordinate conversion and a two-phase/three-phase conversion based on the first system angle θ1. Various kinds of modulation may be added to the three-phase voltage commands.

The first system voltage application unit 34 turns on and off the plural switching devices which the first system inverter 4A has, by PWM (Pulse Width Modulation) control based on the first system three-phase voltage commands Vu1_ref, Vv1_ref, Vw1_ref. The first system voltage application unit 34 generates the switching signal which turns on and off the switching device of each phase, by comparing each of three-phase voltage commands and a carrier wave. The carrier wave is a triangular wave which has an amplitude of DC voltage and oscillates at a carrier frequency. The first system voltage application unit 34 turns on the switching signal when the voltage command exceeds the carrier wave, and turns off the switching signal when the voltage command is below the carrier wave. The switching signal is transmitted as it is to the positive electrode side switching device Sp, and a switching signal obtained by reversing the switching signal is transmitted to the negative electrode side switching device Sn. Each switching signal is inputted into the gate terminal of each switching device of the first system inverter 4A via the gate drive circuit, and each switching device is turned on or off.

1-5-3. Second System Abnormality Detection

When an operation abnormality occurs in the second system control circuit 6B and voltage is no longer applied to the second system three-phase windings N2, the output torque of the AC rotary machine 1 drops. Therefore, when the operation abnormality of the second system control circuit 6B is detected, it is desirable that the first system control circuit 6A takes some measures. On the other hand, in order to detect the operation abnormality of the second system control circuit 6B, it is considered to provide an abnormality detecting circuit for abnormality detecting, such as a communication circuit which performs mutual communication like PLT 1. However, abnormality may occur in the abnormality detecting circuit. In that case, although the second system control circuit 6B is applying voltage to the three-phase winding normally, it may be determined that abnormality of the voltage application operation occur in the second system control circuit 6B. Then, in the present disclosure, without providing a special circuit for detecting abnormality, using the magnetic interference of the resolver 2, it is configured to detect abnormality of the voltage application operation of the second system control circuit 6B with good accuracy.

Then, the second system abnormality detection unit 35 extracts components V1A_TB, V2A_TB of the second period TB from the detection values V1A_S, V2A_S of the output signals of the first system two output windings, determines whether operation of the second system control circuit 6B stops, based on the extracted components V1A_TB, V2A_TB of the second period.

When an operation abnormality occurs in the second system control circuit 6B due to operation abnormality of CPU and the like, the AC voltage VRB with the second period TB is no longer applied to the second system excitation winding 10B. When the AC voltage VRB with the second period TB is no longer applied to the second system excitation winding 10B, the components V1A_TB, V2A_TB of the second period TB which are generated in the first system output signals by the magnetic interference decreases. And, the second system control circuit 6B cannot detect the second system angle θ2 of the AC rotary machine based on the components of the second period TB included in the second system output signals, cannot calculate the second system voltage commands applied to the second system three-phase windings N2 based on the second system angle θ2, and cannot apply voltage to the second system three-phase windings N2. Therefore, utilizing the magnetic interference of the resolver 2, based on the components of the second period TB extracted from the first system output signals, it can be determined with good accuracy whether the operation stop of voltage application occurred in the second system control circuit 6B.

<Extraction Processing of Second Period Component>

In the present embodiment, an extraction processing of second period component is performed based on a principle explained in the following. In the example of FIG. 8, the first period TA is set smaller than the second period TB. As shown in the middle row graph of FIG. 8, the component V1A_TA of the first period included in the output signal of the first output winding becomes the same phase and the equivalent value with the same sign of plus or minus, at an integral multiple period of the first period TA (for example, the first period TA). Therefore, if the two first system output signals before and after the integral multiple period of the first period TA are subtracted mutually, the components of the first period TA can be canceled mutually and the components of the second period TB can be extracted.

Then, as the extraction processing of second period component, the second system abnormality detection unit 35 subtracts the detection values V1A_Solde, V2A_Solde of the output signals of the first system two output windings detected at a detection timing before a second period extraction processing interval δTe1 from this time detection timing, from the detection values V1A_S, V2A_S of the output signals of the first system two output windings detected at this time detection timing. The second period extraction processing interval ΔTe1 is set to an integral multiple of the first period TA, as shown in the next equation. Herein, O is an integer greater than or equal to 1. In the present embodiment, it is set to O=1, and the second period extraction processing interval ΔTe1 is set to the first period TA.

$$\Delta Te1 = TA \times O \qquad (6)$$

In the present embodiment, the second period TB is set to an even multiple of the first period TA, as shown in the equation (2). Accordingly, as shown in the next equation in which the equation (2) is substituted in the equation (6), the second period extraction processing interval ΔTe1 becomes an O/N times of the half period TB/2 of the second period. If O/N is set to odd number like the present embodiment, the second period extraction processing interval ΔTe1 become an odd multiple of the half period TB/2 of the second period.

$$\Delta Te1 = TB/2 \times (O/N) \qquad (7)$$

Therefore, among the detection values V1A_S, V2A_S of the output signals of the first system two output windings, values before and after the odd multiple of the half period TB/2 of the second period are subtracted mutually. Accordingly, as shown in the lower row graph of FIG. 8, in the subtracted two components of the second period, the phases are reversed and the signs of plus or minus are reversed. Therefore, the detection values V1A_Fe, V2A_Fe of the output signals of the first system two output windings after the subtraction processing correspond to double values of the components V1A_TB, V2A_TB of the second period included in the detection values, respectively.

$$V1A\_Fe \approx 2 \times V1A\_TB$$

$$V2A\_Fe \approx 2 \times V2A\_TB \qquad (8)$$

Figure 12:
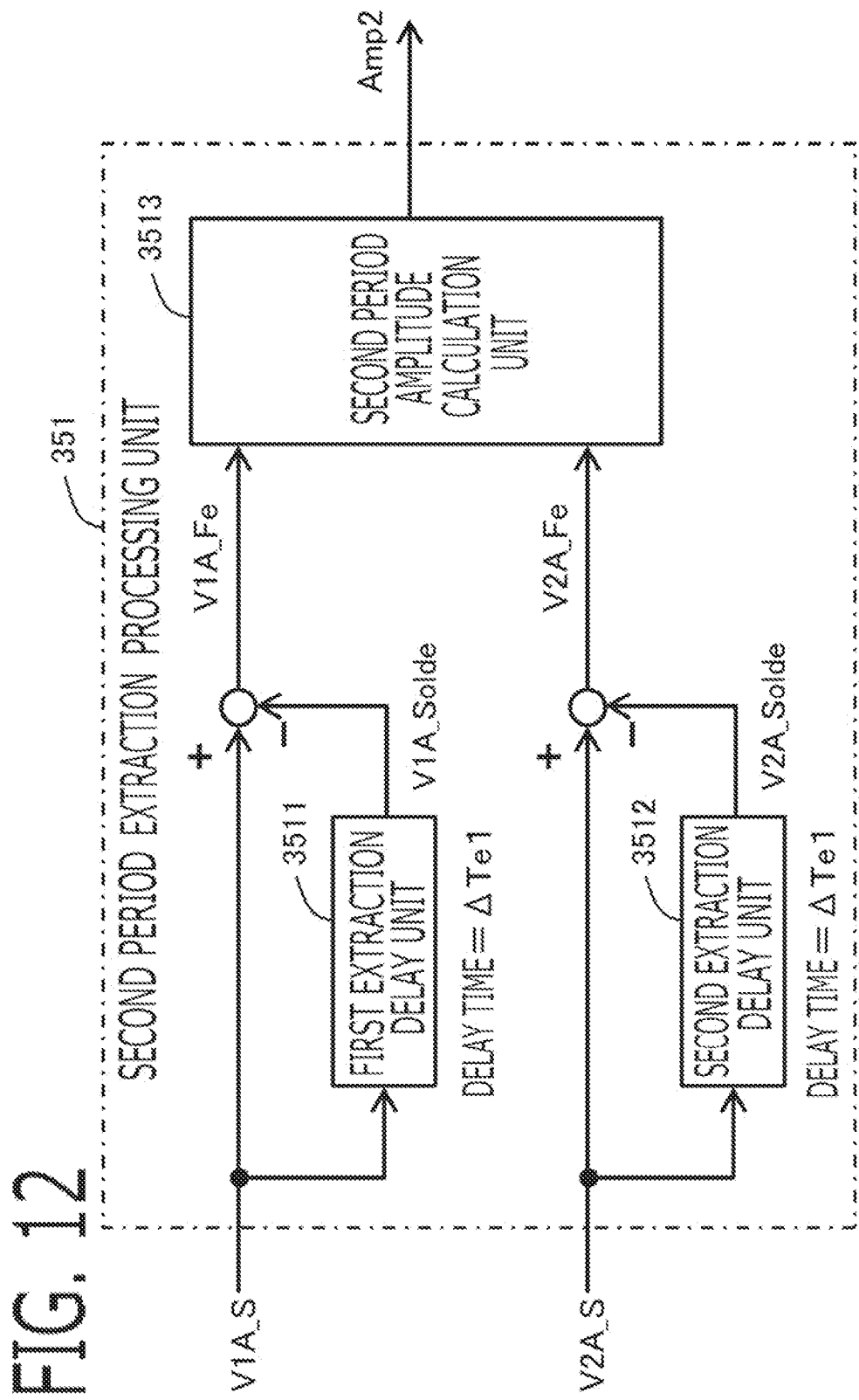
FIG. 12 is a block diagram of the second period extraction processing unit according to Embodiment 1.

The second system abnormality detection unit 35 is provided with a second period extraction processing unit 351 as shows in FIG. 12. The second period extraction processing unit 351 is provided with a first extraction delay unit 3511 which delays the detection value V1A_S of the output signal of the first output winding by the second period extraction processing interval ΔTe1, and outputs; subtracts the output V1A_Solde of the first extraction delay unit 3511 from the detection value V1A_S of the output signal of the first output winding; and calculates the detection value V1A_Fe of the output signal of the first output winding after the extraction processing of second period component. Similarly, the second period extraction processing unit 351 is provided with a second extraction delay unit 3512 which delays the detection value V2A_S of the output signal of the second output winding by the second period extraction processing interval ΔTe1, and outputs; subtracts the output V2A_Solde of the second extraction delay unit 3512 from the detection value V2A_S of the output signal of the second output winding; and calculates the detection value V2A_Fe of the output signal of the second output winding after the extraction processing of second period component.

Then, the second period extraction processing unit 351 is provided with a second period amplitude calculation unit 3513 which calculates an amplitude of the components of the second period based on the detection values V1A_Fe, V2A_Fe of the output signals of the first system two output windings after the extraction processing of second period component.

In the present embodiment, as mentioned above, the phase of the output signal of the first output winding and the phase of the output signal of the second output winding are mutually different 90 degrees in the electrical angle. Accordingly, the detection value V1A_Fe of the output signal of the first output winding after the extraction processing of second period component and the detection value V2A_Fe of the output signal of the second output winding after the extraction processing of second period component become a relationship between a sine wave (sine) and a cosine wave (cos θ). Accordingly, since a total of a square value of the sine wave and a square value of the cosine wave becomes 1 (sin θ²+cos θ²=1), a square value of an amplitude of the second period components can be calculated by adding the square value of the sine wave, and the square value of the cosine wave.

Then, as shown in the next equation, the second period amplitude calculation unit 3513 calculates an amplitude value Amp2 (a square value of amplitude) of the second period components, by adding a square value of the detection value V1A_Fe of the output signal of the first output winding after the extraction processing of second period component and a square value of the detection value V2A_Fe of the output signal of the second output winding after the extraction processing of second period component.

$$Amp2 = V1A\_Fe^2 + V2A\_Fe^2 \qquad (9)$$

<Operation Stop Determination of Second System Control Circuit>

The second system abnormality detection unit 35 is provided with a second system abnormality determination unit. The second system abnormality determination unit determines whether operation of the second system control circuit stops, based on the amplitude of the components of the second period extracted from the first system output signals.

Figure 13:
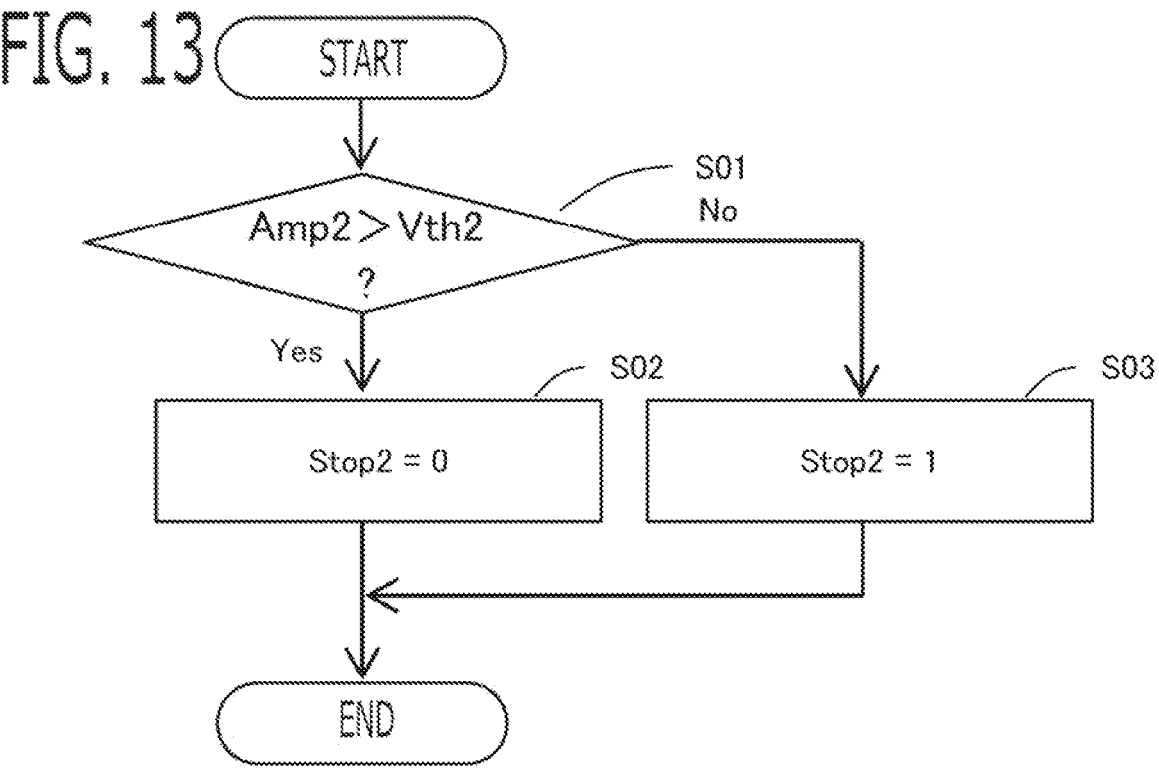
FIG. 13 is a flowchart for explaining processing of the second system abnormality determination unit according to Embodiment 1.

As shown in the flowchart of FIG. 13, in the step S01, the second system abnormality determination unit determines whether the amplitude value Amp2 of the second period components is larger than a determination threshold Vth2 for second period component. And, when it is larger, it advances to the step S02, and when it is not larger, it advances to the step S03. In the step S02, the second system abnormality determination unit sets a second system abnormality determination flag Stop2 to 0, and determines that the operation of the second system control circuit 6B does not stop. On the other hand, in the step S03, the second system abnormality determination unit sets the second system abnormality determination flag Stop2 to 1, and determines that the operation of the second system control circuit 6B stops.

1-5-4. Torque Increase of First System at Time of Abnormal Detection of Second System When determining by the second system abnormality detection unit 35 that the operation of the second system control circuit 6B stops, the first system voltage application unit 34 changes the first system voltage commands so that the output torque by the first system three-phase windings N1 increases more than when determining that the operation of the second system control circuit 6B does not stop.

When the operation of the second system control circuit 6B stops and the second system three-phase windings N2 stop outputting torque, the output torque of the whole AC rotary machine 1 drops. According to the above configuration, when determining that the operation of the second system control circuit 6B stops, the output torque by the first system three-phase windings N1 is increased more than the normal time when determining that the operation stop of the second system control circuit 6B does not stop. Therefore, even when the operation of the second system control circuit 6B stops, the drop of output torque of the whole AC rotary machine 1 can be suppressed.

When determining that the operation of the second system control circuit 6B stops, the current command value calculation unit 331 calculates the first system torque command T1 by multiplying a first system sharing rate of abnormal time to the torque command Tall for making the AC rotary machine output. The first system sharing rate of abnormal time is set to a value larger than the first system sharing rate of normal time (for example, 1.0). As mentioned above, the current command value calculation unit 331 calculates the first system dq-axis current commands Id1_ref, Iq1_ref, based on the first system torque command T1, the power source voltage, the angular speed, and the like. Then, similar to the normal time mentioned above, the current feedback control is performed based on the first system dq-axis current commands Id1_ref, Iq1_ref, the first system three-phase voltage commands Vu1_ref, Vv1_ref, Vw1_ref are calculated, and each switching device is turned on and off.

Figure 14:
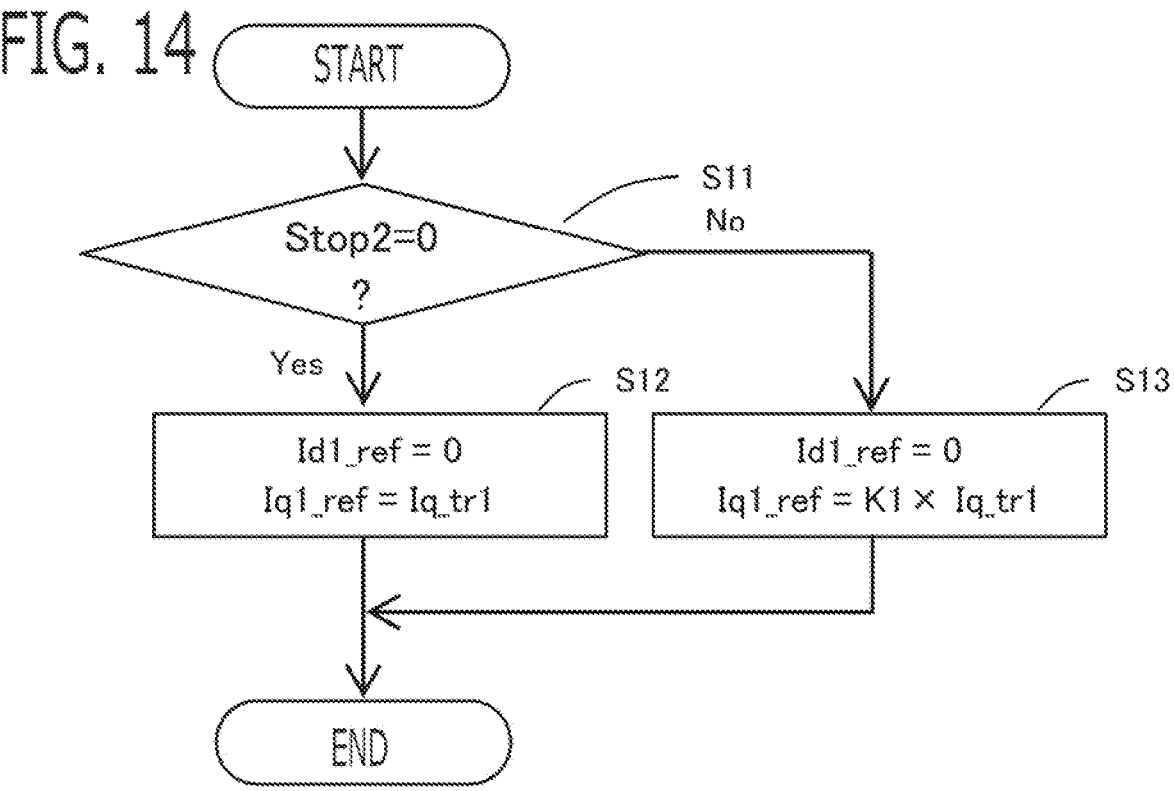
FIG. 14 is a flowchart for explaining processing of the first system current command value calculation unit according to Embodiment 1.

Using the flowchart of FIG. 14, the case where the torque command Tall is given by the first system q-axis current command Iq_tr1 of the Id=0 control at the normal time is explained. In the step S11, the current command value calculation unit 331 determines whether the second system abnormality determination unit determined that the operation of the second system control circuit 6B stops. When being determined that it does not stop, it advances to the step S12, and when being determined that it stops, it advances to the step S13. When the second system abnormality determination flag Stop2 is 0, it is determined that the operation of the second system control circuit 6B does not stop, and when the second system abnormality determination flag Stop2 is 1, it is determined that the operation of the second system control circuit 6B stops.

At the time of normal determination, in the step S12, the current command value calculation unit 331 sets the first system q-axis current command Iq_tr1 as the first system q-axis current command Iq1_ref as it is, and sets the first system d-axis current command Id1_ref to 0. At the time of abnormal determination, in the step S13, the current command value calculation unit 331 sets a value obtained by multiplying an increase rate K1 of abnormal time to the first system q-axis current command Iq_tr1 as the first system q-axis current command Iq1_ref, and sets the first system d-axis current command Id1_ref to 0. The increase rate K1 of abnormal time is set to a value larger than 1 (for example, 2). The increase rate K1 of abnormal time or the first system sharing rate of abnormal time is set considering the cooling performance of the AC rotary machine, the upper limit current of the winding and the switching device, the demagnetization suppression of the permanent magnet and the like.

1-6. Second System Control Circuit 6B

Figure 15:
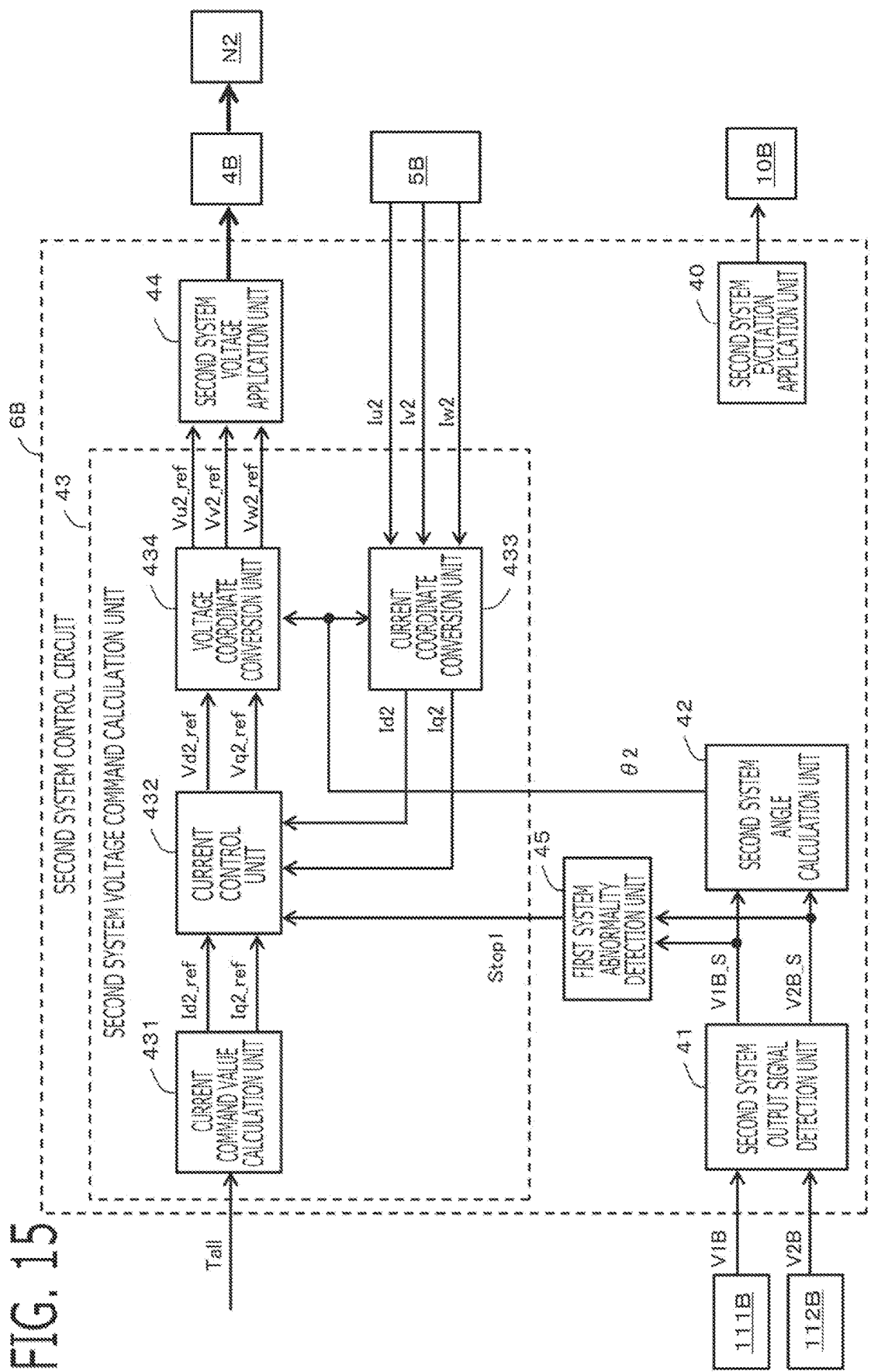
FIG. 15 is a block diagram of the second system control circuit according to Embodiment 1.

As shown in FIG. 15, the second system control circuit 6B is provided with functional units of a second system excitation application unit 40, a second system output signal detection unit 41, a second system angle calculation unit 42, a second system voltage command calculation unit 43, a second system voltage application unit 44, a first system abnormality detection unit 45, and the like.

Figure 16:
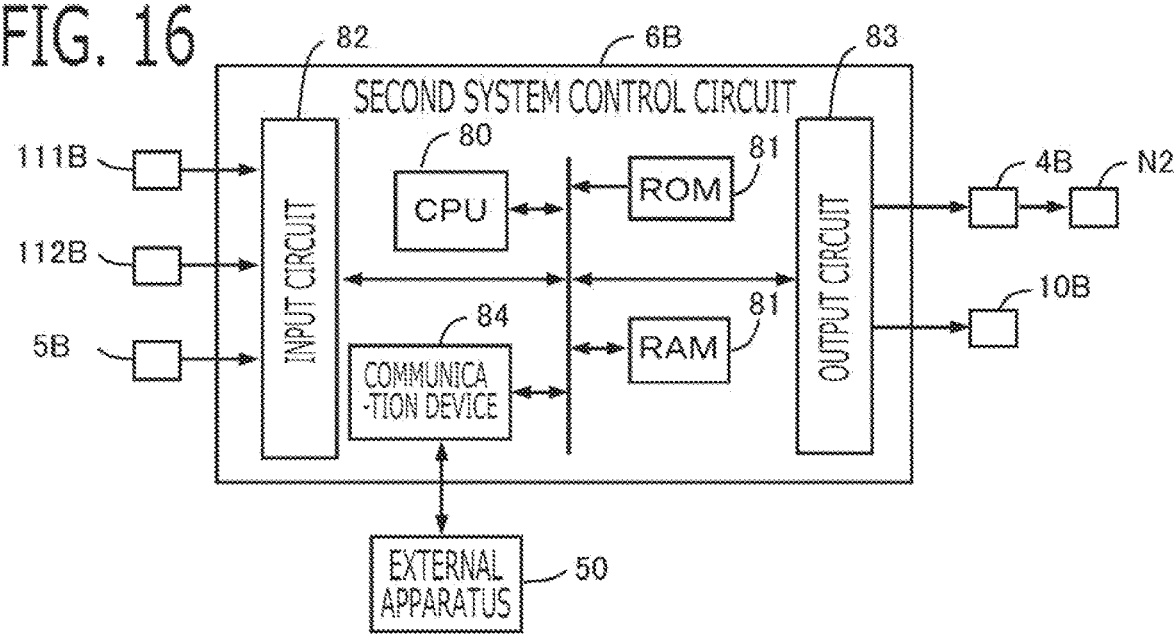
FIG. 16 is a hardware configuration diagram of the second system control circuit according to Embodiment 1.

Respective functional units 40 to 45 and the like provided in the second system control circuit 6B are realized by processing circuits included in the second system control circuit 6B. Specifically, as shown in FIG. 16, the second system control circuit 6B is provided with, as processing circuits, an arithmetic processor (computer) 80 such as a CPU (Central Processing Unit), storage apparatuses 81 which exchange data with the arithmetic processor 80, an input circuit 82 which inputs external signals to the arithmetic processor 80, an output circuit 83 which outputs signals from the arithmetic processor 80 to the outside, a communication device 84 which performs data communication with the external apparatus 50, and the like.

As the arithmetic processor 80, ASIC, IC, DSP, FPGA, various kinds of logical circuits, various kinds of signal processing circuits, and the like may be provided. As the arithmetic processor 80, a plurality of the same type ones or the different type ones may be provided, and each processing may be shared and executed. As the storage apparatuses 81, RAM, ROM, and the like are provided.

Various kinds of sensors, such as the second system third output winding 111B, the fourth output winding 112B, and the second system current sensor 5B, are connected to the input circuit 82. The input circuit 82 is provided with an A/D converter which inputs the output voltage of each output winding and the output signal of sensor into the arithmetic processor 80. The output circuit 83 is connected to the second system excitation winding 10B, and is provided with driving circuits, such as a switching device for applying AC voltage VRB to this excitation winding. The output circuit 83 is connected with electric loads such as a gate drive circuit which drives on and off of the switching devices of the second system inverter 4B, and is provided with driving circuit and the like for outputting a control signal from the arithmetic processor 80. The communication device 84 communicates with the external apparatus 50.

Then, the computing processing unit 80 runs software items (programs) stored in the storage apparatus 81 such as a ROM and collaborates with other hardware devices in the second system control circuit 6B, such as the storage apparatus 81, the input circuit 82, the output circuit 83, and the communication device 84, so that the respective functions of the functional units 40 to 45 included in the second system control circuit 6B are realized. Setting data items, such as the second period, the first period extraction processing interval, the second system removal processing interval, and the determination threshold, to be utilized in the functional units 40 to 45 are stored, as part of software items (programs), in the storage apparatus 81 such as a POM.

1-6-1. Second System Angle Detection Processing

<Second System Excitation Application Unit 40>

The second system excitation application unit 40 applies an AC voltage VRB with the second period TB to the second system excitation winding 10B. The second system excitation application unit 40 may generate a rectangular wave signal of the second period TB by the driving circuit and output binary voltages of a High level (for example, 5V) and a Low level (for example, 0V) alternately, this output may be inputted into a lowpass filter circuit, and an output of the lowpass filter circuit may be applied to the second system excitation winding 10B as the AC voltage VRB.

<Second System Output Signal Detection Unit 41>

The second system output signal detection unit 41 detects periodically the output signals V1B, V2B of the second system two output windings 111B, 112B at preliminarily set detection timing (hereinafter, referred to also as the second system detection timing).

In the present embodiment, the second system output signal detection unit 41 detects the output signals V1B, V2B of the second system two output windings at a timing when the AC voltage VRB with the second period TB applied to the second system excitation winding 10B becomes the maximum value or the minimum value (in this example, the maximum value). That is to say, the second system detection timing is set to the timing at every second period TB.

<Second System Angle Calculation Unit 42>

Figure 17:
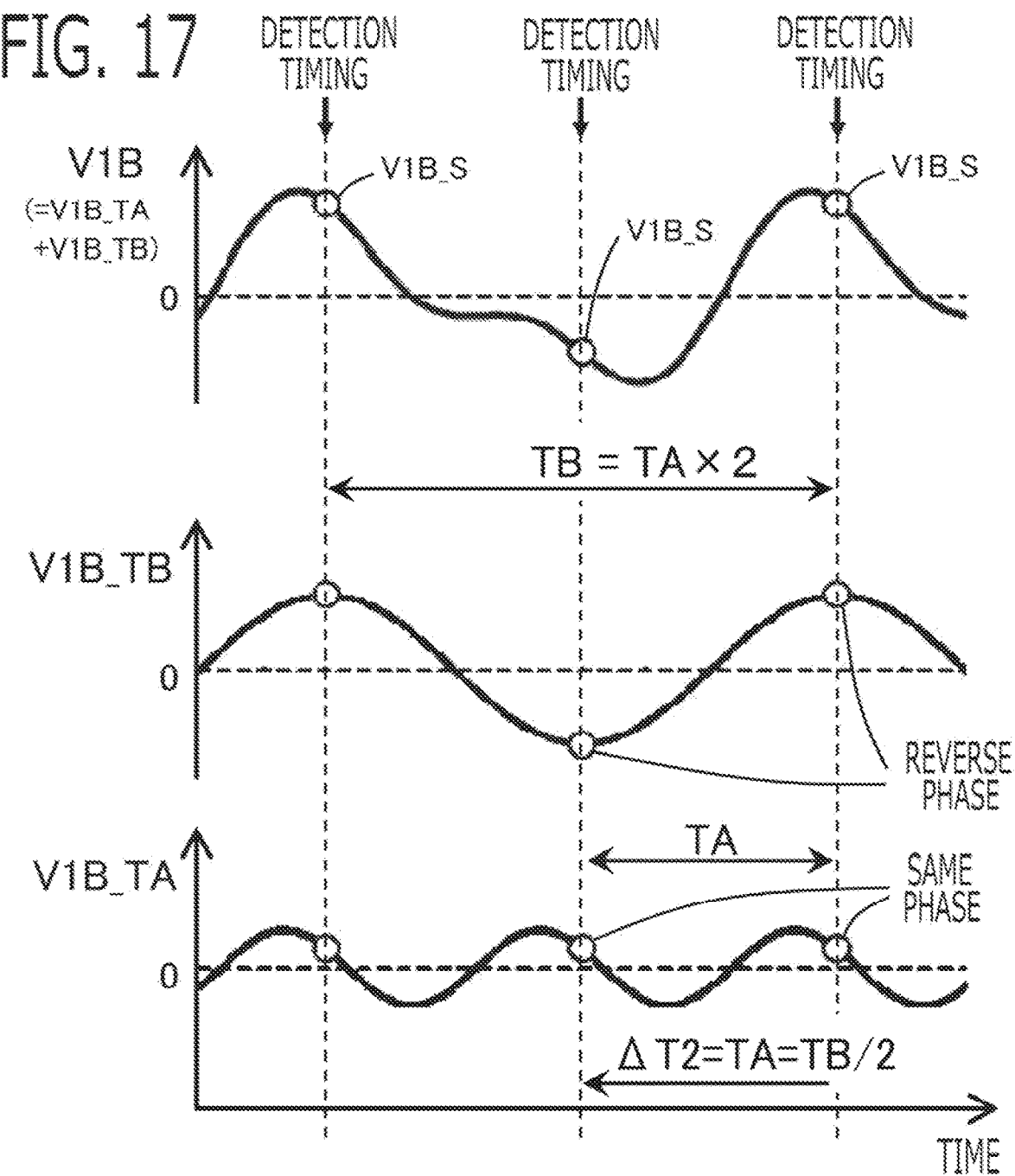
FIG. 17 is a time chart for explaining processing of the second system according to Embodiment 1.

As showing an example of the output signal V1B of the third output winding 111B in FIG. 17, the components V1B_TA, V2B_TA of the first period induced by the magnetic flux of the first period TA excited in the first system excitation winding 10A are superimposed on each of the output signals V1B, V2B of the second system two output windings 111B, 112B, due to the magnetic interference between systems. The output signal V1B of the third output winding 111B is shown in the upper row graph of FIG. 17; the component V1B_TB of the second period induced by the magnetic flux of the second system excitation winding 10B included in the output signal V1B of the third output winding 111B is shown in the middle graph; and the component V1B_TA of the first period induced by the magnetic flux of the first system excitation winding 10A included in the output signal V1B of the third output winding 111B is shown in the lower row graph. The output signal V1B of the third output winding 111B becomes a signal obtained by totaling the component V1B_TB of the second period and the component V1B_TA of the first period. In the present embodiment, the first period TA is set smaller than the second period TB.

Figure 18:
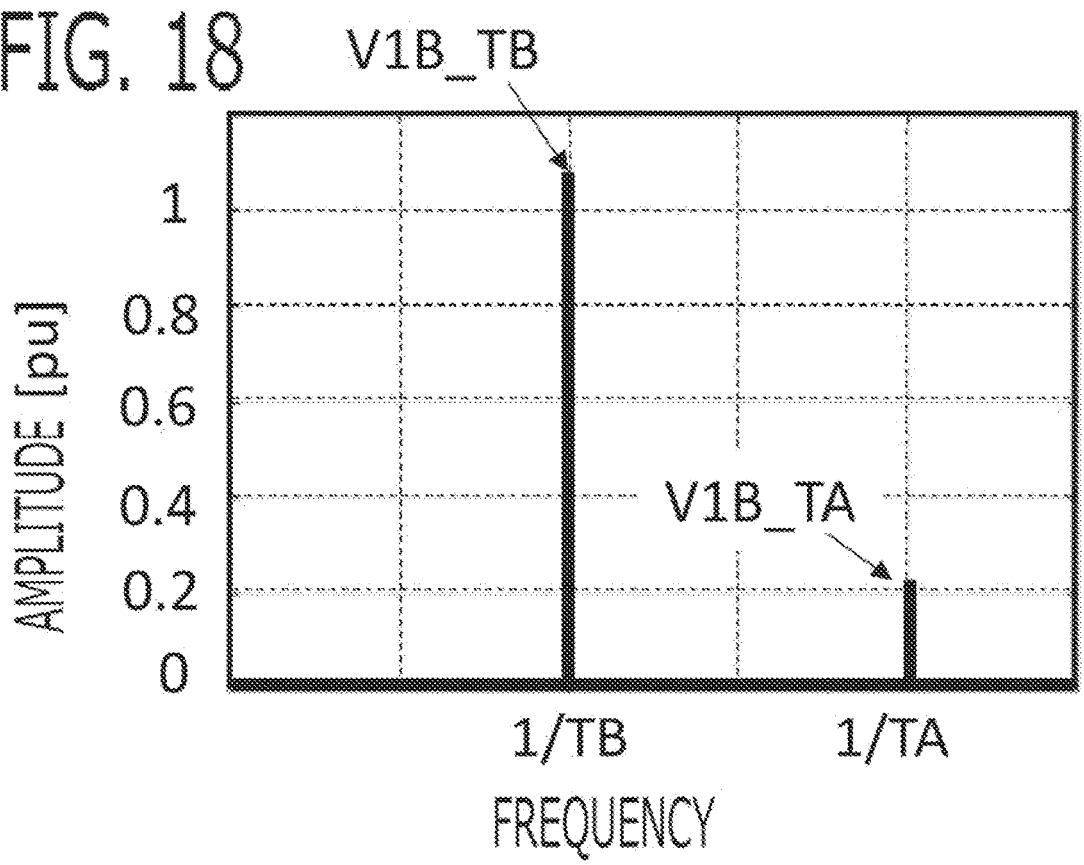
FIG. 18 is a figure for explaining processing of the second system according to Embodiment 1.
Figure 19:
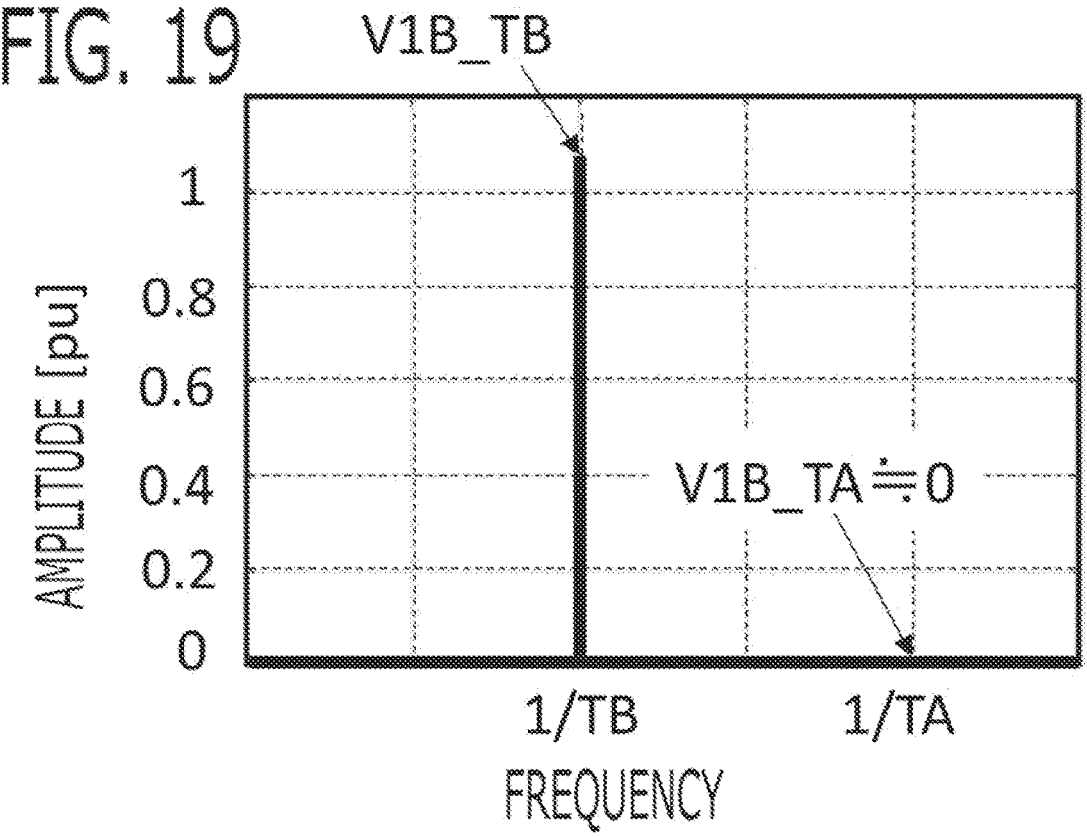
FIG. 19 is a figure for explaining processing of the second system according to Embodiment 1.

Herein, the frequency analysis result of measured value of the output signal V1B of the third output winding is shown in FIG. 18 and FIG. 19. The example of FIG. 18 is a case where the AC voltage VRA with the first period TA is applied to the first system excitation winding 10A, and the example of FIG. 19 is a case where the AC voltage VRA with the first period TA is not applied to the first system excitation winding 10A. As the measurement test condition, it is sets to TA=50 μs and TB=100 μs. The horizontal axis of FIG. 18 and FIG. 19 is a frequency, and the vertical axis is an amplitude of the output signal.

In the example of FIG. 18, the component V1B_TA of the first period resulting from the AC voltage with the first period TA applied to the first system excitation winding 10A is superimposed on the output signal V1B of the third output winding, as the interference voltage, in addition to the component V1B_TB of the second period resulting from the AC voltage with the second period TB applied to the second system excitation winding 10B. In the example of FIG. 19, the component V1B_TB of the second period is superimposed on the output signal V1B of the third output winding, and the component V1B_TA of the first period is not superimposed on it. The same applies to the output signal V2B of the fourth output winding.

Accordingly, if the angle is calculated based on the output signal V1B of the third output winding and the output signal V2B of the fourth output winding on which the components V1B_TA, V2B_TA of the first period are superimposed, the detection error will occur. Therefore, in order to suppress the detection error of the angle, it is necessary to remove the components V1B_TA, V2B_TA of the first period from the output signal V1B of the third output winding and the output signal V2B of the fourth output winding.

Then, the second system angle calculation unit 42 is provided with a second system removal processing unit 421 and a second system angle after removal processing calculation unit. Then, the second system removal processing unit 421 performs a first period component removal processing which removes (decreases) the component of the first period, to the detection values V1B_S, V2B_S of the output signals of the second system two output windings. Then, the second system angle after removal processing calculation unit calculates a second system angle θ2 based on the detection values V1B_F, V2B_F of the output signals of the second system two output windings after the first period component removal processing.

In the present embodiment, based on the principle explained in the following, the first period component removal processing is performed. As shown in the lower row graph of FIG. 17, the component V1B_TA of the first period included in the output signal of the third output winding becomes the same phase and the equivalent value with the same sign of plus or minus, at an integral multiple period of the first period TA (for example, the first period TA).

Then, as the first period component removal processing, the second system removal processing unit 421 subtracts the detection values V1B_Sold, V2B_Sold of the output signals of the second system two output windings detected at a detection timing before a second system removal processing interval ΔT2 from this time detection timing, from the detection values V1B_S, V2B_S of the output signals of the second system two output windings detected at this time detection timing. The second system removal processing interval ΔT2 is set as shown in the next equation. Herein, P is an integer greater than or equal to 1. In the present embodiment, it is set to P=1, and the second system removal processing interval ΔT2 is set to the first period TA.

$$\Delta T2 = TA \times P \quad (10)$$

In the present embodiment, the second period TB is set to an even multiple of the first period TA, as shown in the equation (2). In the present embodiment, the second period TB is to a twice of the first period TA.

According to this setting, as shown in the next equation in which the equation (2) is substituted in the equation (10), the second system removal processing interval ΔT2 becomes a P/N times of the half period TB/2 of the second period. If P/N is set to odd number like the present embodiment, the second system removal processing interval ΔT2 become an odd multiple of the half period TB/2 of the second period.

$$\Delta T2 = TB/2 \times (P/N) \quad (11)$$

Therefore, among the detection values V1B_S, V2B_S of the output signals of the second system two output windings, values before and after the odd multiple of the half period TB/2 of the second period are subtracted mutually. Accordingly, as shown in the middle row graph of FIG. 17, in the subtracted two components of the second period, the phases are reversed and the signs of plus or minus are reversed. Therefore, the detection values V1B_F, V2B_F of the output signals of the second system two output windings after the subtraction processing correspond to the double values of the components of the second period V1B_TB, V2B_TB included in the detection values, respectively.

$$V1B\_F \approx 2 \times V1B\_TB$$

$$V2B\_F \approx 2 \times V2B\_TB \tag{12}$$

Figure 20:
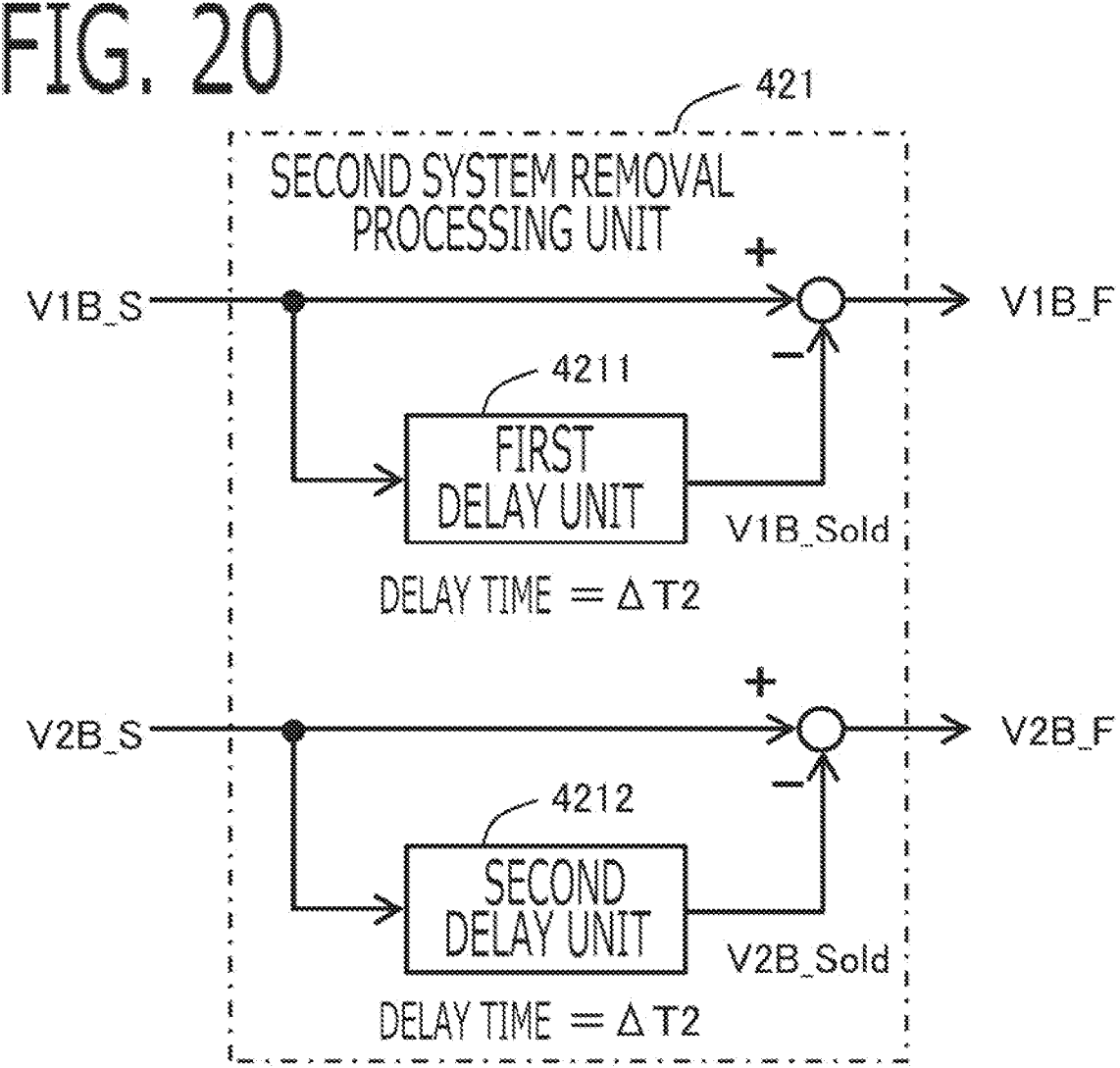
FIG. 20 is a block diagram of the second system removal processing unit according to Embodiment 1.

The second system removal processing unit 421 is constituted, for example, as shown in FIG. 20. The second system removal processing unit 421 is provided with a first delay unit 4211 which delays the detection value V1B_S of the output signal of the third output winding by the second system removal processing interval ΔT2, and outputs; subtracts the output V1B_Sold of the first delay unit 4211 from the detection value V1B_S of the output signal of the third output winding; and calculates the detection value V1B_F of the output signal of the third output winding after the first period component removal processing. Similarly, the second system removal processing unit 421 is provided with a second delay unit 4212 which delays the detection value V2B_S of the output signal of the fourth output winding by the second system removal processing interval ΔT2, and outputs; subtracts the output V2B_Sold of the second delay unit 4212 from the detection value V2B_S of the output signal of the fourth output winding; and calculates the detection value V2B_F of the output signal of the fourth output winding after the first period component removal processing.

Then, the second system angle after removal processing calculation unit calculates the second system angle θ2 based on the detection values V1B_F, V2B_F of the output signals of the second system two output windings after subtraction.

According to this configuration, the two components of the first period which become the equivalent values with the same sign of plus or minus with each other are subtracted, and the two components of the first period are canceled with each other. Accordingly, in the detection values V1B_F, V2B_F of the output signals of the second system two output windings after subtraction, the components of the first period are removed. Then, based on the detection values after removing the component of the first period, the second system angle θ2 can be calculated with good accuracy.

In the present embodiment, as shown in the next equation, the second system angle after removal processing calculation unit calculates the second system angle θ2 by calculating an arc tangent (an arc tangent function) of a ratio between the detection value V1B_F of the output signal of the third output winding and the detection value V2B_F of the output signal of the fourth output winding after the first period component removal processing. An angular speed is also calculated based on the second system angle θ2.

$$\theta 2 = \tan^{-1}(V1B\_F / V2B\_F) \tag{13}$$

1-6-2. Second System Voltage Application Processing

The second system voltage command calculation unit 43 calculates second system three-phase voltage commands Vu2_ref, Vv2_ref, Vw2_ref applied to the second system three-phase windings N2, based on the second system angle θ2. Then, the second system voltage application unit 44 turns on and off the plural switching devices of the second system inverter 4B based on the second system three-phase voltage commands Vu2_ref, Vv2_ref, Vw2_ref, and applies voltage to the second system three-phase windings N2.

In the present embodiment, by a current feedback control on the dq-axis rotating coordinate system rotated synchronizing with the second system angle θ2, the second system three-phase voltage commands Vu2_ref, Vv2_ref, Vw2_ref are calculated. The second system voltage command calculation unit 43 is provided with a current command value calculation unit 431, a current control unit 432, a current coordinate conversion unit 433, and a voltage coordinate conversion unit 434.

The current command value calculation unit 431 calculates a d-axis current command Id2_ref and a q-axis current command Iq2_ref. When determining by the first system abnormality detection part 45 described below that the operation of the first system control circuit 6A does not stop, the current command value calculation unit 431 calculates a second system torque command T2 by multiplying a second system sharing rate of normal time to the torque command Tall for making the AC rotary machine output. The second system sharing rate of normal time is set to a value smaller than 1 (for example, 0.5). The current command value calculation unit 431 calculates second system dq-axis current commands Id2_ref, Iq2_ref according to the current vector control method, based on the second system torque command T2, the power source voltage, the angular speed, and the like. In the present embodiment, the torque command Tall is transmitted from the external apparatus 50. The torque command Tall may be a second system torque command of normal time after sharing. The torque command Tall may be a q-axis current command of the Id=0 control. The torque command Tall may be calculated in the current command value calculation unit 431.

The current coordinate conversion unit 433 converts current detection values Iu2, Iv2, Iw2 which flow into the second system winding of each phase detected by the second system current sensor 5B into a second system d-axis current detection value Id2 and a second system q-axis current detection value Iq2 which are expressed on the dq-axis rotating coordinate system, by performing a three-phase/two-phase conversion and a rotating coordinate conversion based on the second system angle θ2.

The current control unit 432 performs a feedback control which changes a second system d-axis voltage command Vd2_ref and a second system q-axis voltage command Vq2_ref by PI control and the like so that the second system d-axis current detection value Id2 and the second system q-axis current detection value Iq2 approach the second system d-axis current command Id2_ref and the second system q-axis current command Iq2_ref.

The voltage coordinate conversion unit 434 converts the second system d-axis voltage command Vd2_ref and the second system q-axis voltage command Vq2_ref into the second system three-phase voltage commands Vu2_ref, Vv2_ref, Vw2_ref, by performing a fixed coordinate conversion and a two-phase/three-phase conversion based on the second system angle θ2. Various kinds of modulation may be added to the three-phase voltage commands.

The second system voltage application unit 44 turns on and off the plural switching devices which the second system inverter 4B has, by PWM control based on the second system three-phase voltage commands Vu2_ref, Vv2_ref, Vw2_ref. The second system voltage application unit 44 generates the switching signal which turns on and off the switching device of each phase, by comparing each of three-phase voltage commands and a carrier wave. Each switching signal is inputted into the gate terminal of each switching device of the second system inverter 4B via the gate drive circuit, and each switching device is turned on or off.

1-6-3. First System Abnormality Detection

Similar to the second system abnormality detection mentioned above, without providing a special circuit for detecting abnormality, using the magnetic interference of the resolver 2, it is configured to detect abnormality of the voltage application operation of the first system control circuit 6A with good accuracy.

Then, the first system abnormality detection unit 45 extracts components V1B_TA, V2B_TA of the first period TA from the detection values V1B_S, V2B_S of the output signals of the second system two output windings, determines whether the operation of the first system control circuit 6A stops, based on the extracted components V1B_TA, V2B_TA of the first period.

When an operation abnormality occurs in the first system control circuit 6A due to operation abnormality of CPU and the like, the AC voltage VRA with the first period TA is no longer applied to the first system excitation winding 10A. When the AC voltage VRA with the first period TA is no longer applied to the first system excitation winding 10A, the components V1B_TA, V2B_TA of the first period TA which are generated in the second system output signals by the magnetic interference decreases. And, the first system control circuit 6A cannot detect the first system angle θ1 of the AC rotary machine based on the components of the first period TA included in the first system output signals, cannot calculate the first system voltage commands applied to the first system three-phase windings N1 based on the first system angle θ1, and cannot apply voltage to the first system three-phase windings N1. Therefore, utilizing the magnetic interference of the resolver 2, based on the components of the first period TA extracted from the second system output signals, it can be determined with good accuracy whether the operation stop of voltage application occurred in the first system control circuit 6A.

<Extraction Processing of First Period Component>

In the present embodiment, an extraction processing of first period component is performed based on a principle explained in the following. In the example of FIG. 17, the first period TA is set smaller than the second period TB. As shown in the middle row graph of FIG. 17, in the component V1B_TB of the second period of the output signal of the third output winding, the phase is reversed and the sign of plus or minus is reversed in a period obtained by adding an integral multiple of the second period TB to the half period TB/2 of the second period (for example, half period TB/2 of the second period). Therefore, if the two second system output signals before and after the period obtained by adding the integral multiple of the second period TB to the half period TB/2 of the second period are added mutually, the components of the second period TB can be canceled mutually and the components of the first period TA can be extracted.

Then, as the extraction processing of first period component, the first system abnormality detection unit 45 adds the detection values V1B_S, V2B_S of the output signals of the second system two output windings detected at this time detection timing, and the detection values V1B_Solde, V2B_Solde of the output signals of the second system two output windings detected at a detection timing before a first period extraction processing interval $\Delta Te2$ from this time detection timing. The first period extraction processing interval $\Delta Te2$ is set as shown in the next equation. Herein, Q is an integer greater than or equal to 0. In the present embodiment, it is set to Q=0, and the first period extraction processing interval $\Delta Te2$ is set to the half period TB/2 of the second period.

$$\Delta Te2 = TB/2 + TB \times Q \quad (14)$$

In the present embodiment, the second period TB is set to an even multiple of the first period TA, as shown in the equation (2). Accordingly, as shown in the next equation in which the equation (2) is substituted in the equation (14), the first period extraction processing interval $\Delta Te2$ becomes an integral multiple of the first period TA.

$$\Delta T2e = TA \times (N + 2 \times N \times Q) \quad (15)$$

Therefore, among the detection values V1B_S, V2B_S of the output signals of the second system two output windings, values before and after the integral multiple of the first period TA are added. Then, as shown in the lower row graph of FIG. 17, since the added two components of the first period have the same phase, and become the equivalent values with the same sign of plus or minus. Therefore, the detection values V1B_Fe, V2B_Fe of the output signals of the second system two output windings after addition processing correspond to the double values of the components V1B_TA, V2B_TA of the first period included in the detection values, respectively.

$$V1B\_Fe \approx 2 \times V1B\_TA$$

$$V2B\_Fe \approx 2 \times V2B\_TA \quad (16)$$

Figure 21:
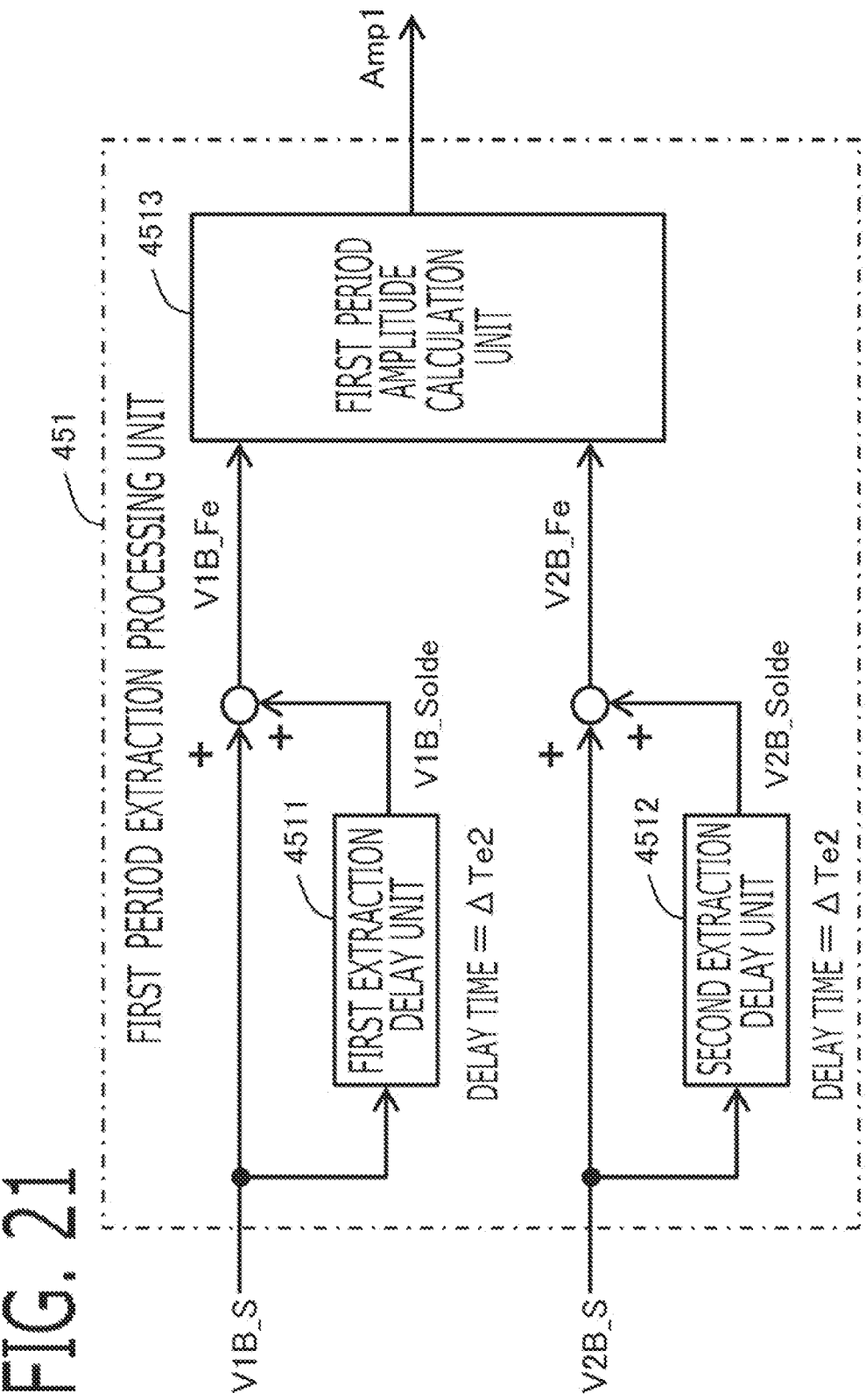
FIG. 21 is a block diagram of the first period extraction processing unit according to Embodiment 1.

The first system abnormality detection unit 45 is provided with a first period extraction processing unit 451 as shows in FIG. 21. The first period extraction processing unit 451 is provided with a first extraction delay unit 4511 which delays the detection value V1B_S of the output signal of the third output winding by the first period extraction processing interval $\Delta Te2$, and outputs; subtracts the output V1B_Solde of the first extraction delay unit 4511 from the detection value V1B_S of the output signal of the third output winding; and calculates the detection value V1B_Fe of the output signal of the third output winding after the extraction processing of first period component. Similarly, the first period extraction processing unit 451 is provided with a second extraction delay unit 4512 which delays the detection value V2B_S of the output signal of the fourth output winding by the first period extraction processing interval $\Delta Te2$, and outputs; subtracts the output V2B_Solde of the second extraction delay unit 4512 from the detection value V2B_S of the output signal of the fourth output winding; and calculates the detection value V2B_Fe of the output signal of the fourth output winding after the extraction processing of first period component.

Then, the first period extraction processing unit 451 is provided with a first period amplitude calculation unit 4513 which calculates an amplitude of the components of the first period based on the detection values V1B_Fe, V2B_Fe of the output signals of the second system two output windings after the extraction processing of first period component.

In the present embodiment, as mentioned above, the phase of the output signal of the third output winding and the phase of the output signal of the fourth output winding are mutually different 90 degrees in the electrical angle. Accordingly, the detection value V1B_Fe of the output signal of the third output winding after the extraction processing of first period component and the detection value V2B_Fe of the output signal of the fourth output winding after the extraction processing of first period component become a relationship between a sine wave (sine) and a cosine wave (cos θ). Accordingly, since a total of a square value of the sine wave and a square value of the cosine wave becomes 1 (sin θ²+cos θ²=1), a square value of an amplitude of the first period components can be calculated by adding the square value of the sine wave, and the square value of the cosine wave.

Then, as shown in the next equation, the first period amplitude calculation unit 4513 calculates an amplitude value Amp1 (a square value of amplitude) of the first period components, by adding a square value of the detection value V1B_Fe of the output signal of the third output winding after the extraction processing of first period component and a square value of the detection value V2B_Fe of the output signal of the fourth output winding after the extraction processing of first period component.

$$Amp1 = V1B\_Fe^2 + V2B\_Fe^2 \quad (17)$$

<Operation Stop Determination of First System Control Circuit>

The first system abnormality detection unit 45 is provided with a first system abnormality determination unit. The first system abnormality determination unit determines whether operation of the first system control circuit stops, based on the amplitude of the components of the first period extracted from the second system output signals.

As shown in the flowchart of FIG. 22, in the step S31, the first system abnormality determination unit determines whether the amplitude value Amp1 of the first period components is larger than a determination threshold Vth1 for first period component. And, when it is larger, it advances to the step S32, and when it is not larger, it advances to the step S33. In the step S32, the first system abnormality determination unit sets a first system abnormality determination flag Stop1 to 0, and determines that the operation of the first system control circuit 6A does not stop. On the other hand, in the step S33, the first system abnormality determination unit sets the first system abnormality determination flag Stop1 to 1, and determines that the operation of the first system control circuit 6A stops.

1-6-4. Torque Increase of Second System at Time of Abnormal Detection of First System When determining by the first system abnormality detection unit 45 that the operation of the first system control circuit 6A stops, the second system voltage application unit 44 changes the second system voltage commands so that the output torque by the second system three-phase windings N2 increases more than when determining that the operation of the first system control circuit 6A does not stop.

When the operation of the first system control circuit 6A stops and the first system three-phase windings N1 stop outputting torque, the output torque of the whole AC rotary machine 1 drops. According to the above configuration, when determining that the operation of the first system control circuit 6A stops, the output torque by the second system three-phase windings N2 is increased more than the normal time when determining that the operation stop of the first system control circuit 6A does not stop. Therefore, even when the operation of the first system control circuit 6A stops, the drop of output torque of the whole AC rotary machine 1 can be suppressed.

When determining that the operation of the first system control circuit 6A stops, the current command value calculation unit 431 calculates the second system torque command T2 by multiplying a second system sharing rate of abnormal time to the torque command Tall for making the AC rotary machine output. The second system sharing rate of abnormal time is set a value larger than the second system sharing rate of normal time (for example, 1.0). As mentioned above, the current command value calculation unit 431 calculates the second system dq-axis current commands Id2_ref, Iq2_ref, based on the second system torque command T2, the power source voltage, the angular speed, and the like. Then, similar to the normal time mentioned above, the current feedback control is performed based on the second system dq-axis current commands Id2_ref, Iq2_ref, the second system three-phase voltage commands Vu2_ref, Vv2_ref, Vw2_ref are calculated, and each switching device is turned on and off.

Using the flowchart of FIG. 23, the case where the torque command Tall is given by the second system q-axis current command Iq_tr2 of the Id=0 control at the normal time is explained. In the step S41, the current command value calculation unit 431 determines whether the first system abnormality determination unit determined that the operation of the first system control circuit 6A stops. When being determined that it does not stop, it advances to the step S42, and when being determined that it stops, it advances to the step S43. When the first system abnormality determination flag Stop1 is 0, it is determined that the operation of the first system control circuit 6A does not stop, and when the first system abnormality determination flag Stop1 is 1, it is determined that the operation of the first system control circuit 6A stops.

At the time of normal determination, in the step S42, the current command value calculation unit 431 sets the second system q-axis current command Iq_tr2 as the second system q-axis current command Iq2_ref as it is, and sets the second system d-axis current command Id2_ref to 0. At the time of abnormal determination, in the step S43, the current command value calculation unit 431 sets a value obtained by multiplying an increase rate K2 of abnormal time to the second system q-axis current command Iq_tr2 as the second system q-axis current command Iq2_ref, and sets the second system d-axis current command Id2_ref to 0. The increase rate K2 of abnormal time is set to a value larger than 1 (for example, 2). The increase rate K2 of abnormal time or the second system sharing rate of abnormal time is set considering the cooling performance of the AC rotary machine, the upper limit current of the winding and the switching device, the demagnetization suppression of the permanent magnet and the like.

2. Embodiment 2

Next, the AC rotary machine apparatus according to Embodiment 2 will be explained. The explanation for constituent parts the same as those in Embodiment 1 will be omitted. The basic configuration and processing of the AC rotary machine apparatus according to the present embodiment is the same as that of Embodiment 1. Embodiment 2 is different from Embodiment 1 in that the AC rotary machine 1 is an AC rotary machine for an electric power steering apparatus which outputs an electric steering torque which drives a steering apparatus of a vehicle.

FIG. 24 is a schematic configuration diagram of the electric power steering apparatus. The AC rotary machine apparatus is built into the electric power steering apparatus. The rotation axis of the rotor of the AC rotary machine 1 is connected with a steering apparatus 63 of the wheels 62 via a driving force transmission mechanism 61. For example, the electric power steering apparatus is provided with a handle 64 that a driver rotates right and left, a shaft 65 that is connected with the handle 64 and transmits a steering wheel torque by the handle 64 to the steering apparatus 63 of the wheels 62, a torque sensor 66 that is mounted on the shaft 65 and detects a steering torque Ts by the handle 64, and a driving force transmission mechanisms 61, such as a worm gear mechanism, which connects the rotation axis of the AC rotary machine 1 with the shaft 65. The output signal of the torque sensor 66 is inputted into the first system control circuit 6A (the input circuit 92) and the second system control circuit 6B (the input circuit 82).

<Control at Normal Time>

When determining that operation of the first system control circuit 6A and the second system control circuit 6B does not stop, the first system control circuit 6A and the second system control circuit 6B share the electric steering torque with the first system plural-phase windings N1 and the second system plural-phase windings N2 to output.

In the present embodiment, the first system control circuit 6A (the current command value calculation unit 331) detects the steering torque Ts of the driver, based on the output signal of the torque sensor 66. Then, the first system control circuit 6A calculates a first system electric steering torque for assisting the steering torque Ts, based on the steering torque Ts. In the present embodiment, the q-axis current command of the Id=0 control is calculated as the electric steering torque. For example, when determining that the operation of the second system control circuit 6B does not stop, as shown in the equation (18), the first system control circuit 6A calculates the first system q-axis current command Iq1_ref by multiplying a first system coefficient Ka1 of normal time to the steering torque Ts. The first system d-axis current command Id1_ref is set to 0.

$$Id1\_ref=0$$

$$Iq1\_ref=Ka1 \times Ts \quad (18)$$

The second system control circuit 6B (the current command value calculation unit 431) detects the steering torque Ts of the driver, based on the output signal of the torque sensor 66. Then, the second system control circuit 6B calculates a second system electric steering torque for assisting the steering torque Ts, based on the steering torque Ts. In the present embodiment, the q-axis current command of the Id-O control is calculated as the electric steering torque. For example, when determining that the operation of the first system control circuit 6A does not stop, as shown in the equation (19), the second system control circuit 6B calculates the second system q-axis current command Iq2_ref by multiplying a second system coefficient Ka2 of normal time to the steering torque Ts. The second system d-axis current command Id2_ref is set to 0.

$$Id2\_ref=0$$

$$Iq2\_ref=Ka2 \times Ts \quad (19)$$

The first system coefficient Ka1 and the second system coefficient Ka2 of normal time may be the same values or different values, and may be changed according to the travelling speed of the vehicle. Well-known stabilization compensation control may be used for the calculation of the current command.

<Control at Abnormal Time>

When determining that the operation of the second system control circuit 6B stops, the first system control circuit 6A changes the first system voltage commands so that a sharing rate by which the electric steering torque is shared with the first system three-phase windings N1 to output increases more than when determining that the operation of the second system control circuit 6B does not stop. When determining that the operation of the first system control circuit 6A stops, the second system control circuit 6B changes the second system voltage commands so that a sharing rate by which the electric steering torque is shared with the second system three-phase windings N2 to output increases more than when determining that the operation of the first system control circuit 6A does not stop.

In the present embodiment, when determining that the operation of the second system control circuit 6B stops, as shown in the equation (20), the first system control circuit 6A (the current command value calculation unit 331) calculates the first system q-axis current command Iq1_ref by multiplying the first system coefficient Ka1 of normal time and the increase rate K1 of abnormal time to the steering torque Ts. The first system d-axis current command Id1_ref is set to 0. The increase rate K1 of abnormal time is set to a value larger than 1 (for example, 2).

$$Id1\_ref=0$$

$$Iq1\_ref=K1 \times Ka1 \times Ts \quad (20)$$

When determining that the operation of the first system control circuit 6A stops, as shown in the equation (21), the second system control circuit 6B (the current command value calculation unit 431) calculates the second system q-axis current command Iq2_ref by multiplying the second system coefficient Ka2 of normal time and the increase rate K2 of abnormal time to the steering torque Ts. The second system d-axis current command Id2_ref is set to 0. The increase rate K2 of abnormal time is set to a value larger than 1 (for example, 2).

$$Id2\_ref=0$$

$$Iq2\_ref=K2 \times Ka2 \times Ts \quad (21)$$

Then, similar to Embodiment 1, in the first system control circuit 6A, the current feedback control is performed based on the first system dq-axis current commands Id1_ref, Iq1_ref calculated by the equation (18) or the equation (20), the first system three-phase voltage commands Vu1_ref, Vv1_ref, Vw1_ref are calculated, and each switching device of the first system is turned on and off. Similar to Embodiment 1, in the second system control circuit 6B, the current feedback control is performed based on the second system dq-axis current commands Id2_ref, Iq2_ref calculated by the equation (19) or the equation (21), the second system three-phase voltage commands Vu2_ref, Vv2_ref, Vw2_ref are calculated, and each switching device of the second system is turned on and off.

According to this configuration, even at the abnormal time of the first system control circuit or the second system control circuit, the drop of the electric steering torque can be suppressed, and the deterioration of the steering performance of wheel can be suppressed.

The electric power steering apparatus in which the AC rotary machine apparatus is embedded may be an apparatus for automatic driving which steers automatically without handle operation of the driver.

Other Embodiments

Lastly, other embodiments of the present disclosure will be explained. Each of the configurations of embodiments to be explained below is not limited to be separately utilized but can be utilized in combination with the configurations of other embodiments as long as no discrepancy occurs.

(1) In each of the above-mentioned embodiments, there was explained the case where, as the extraction processing of second period component, the first system control circuit 6A subtracts the detection values V1A_Solde, V2A_Solde of the output signals of the first system two output windings detected at the detection timing before the second period extraction processing interval ΔTe1 from this time detection timing, from the detection values V1A_S, V2A_S of the output signals of the first system two output windings detected at this time detection timing. However, embodiments of the present disclosure are not limited to the foregoing case. That is to say, any processing may be performed as long as the first system control circuit 6A extracts the components V1A_TB, V2A_TB of the second period TB from the detection values V1A_S, V2A_S of the output signals of the first system two output windings. For example, as the extraction processing of second period component, the first system control circuit 6A may perform a filter processing, such as a high pass filter processing, a low pass filter processing, or a band pass filter processing, which reduces the component of the first period and passes the component of the second period.

(2) In each of the above-mentioned embodiments, there was explained the case where, as the extraction processing of first period component, the second system control circuit 6B adds the detection values V1B_S, V2B_S of the output signals of the second system two output windings detected at this time detection timing, and the detection values V1B_Solde, V2B_Solde of the output signals of the second system two output windings detected at the detection timing before the first period extraction processing interval ΔTe2 from this time detection timing. However, embodiments of the present disclosure are not limited to the foregoing case. That is to say, any processing may be performed as long as the second system control circuit 6B extracts the components V1B_TA, V2B_TA of the first period TA from the detection values V1B_S, V2B_S of the output signals of the second system two output windings. For example, as the extraction processing of first period component, the second system control circuit 6B may perform a filter processing, such as a high pass filter processing, a low pass filter processing, or a band pass filter processing, which reduces the component of the second period and passes the component of the first period.

(3) In each of the above-mentioned embodiments, there was explained the case where, as shown in the equation (9), the first system control circuit 6A calculates an amplitude value Amp2 (a square value of amplitude) of the second period components, by adding a square value of the detection value V1A_Fe of the output signal of the first output winding after the extraction processing of second period component and a square value of the detection value V2A_Fe of the output signal of the second output winding after the extraction processing of second period component. However, embodiments of the present disclosure are not limited to the foregoing case. That is to say, any processing may be performed as long as the first system control circuit 6A calculates an amplitude of the second period components extracted from the detection values of the output signals of the first system two output windings. For example, the first system control circuit 6A may detect the maximum value and the minimum value during a predetermined period from each of two values V1A_Fe, V2A_Fe after the extraction processing of second period component, and may calculate an amplitude from a difference between the maximum value and the minimum value. And, the first system control circuit 6A may calculate an amplitude from one of two values V1A_Fe, V2A_Fe after the extraction processing of second period component, or may calculate an amplitude from both and may calculate their average value.

(4) In each of the above-mentioned embodiments, there was explained the case where, as shown in the equation (17), the second system control circuit 6B calculates an amplitude value Amp1 (a square value of amplitude) of the first period components, by adding a square value of the detection value V1B_Fe of the output signal of the third output winding after the extraction processing of first period component and a square value of the detection value V2B_Fe of the output signal of the fourth output winding after the extraction processing of first period component. However, embodiments of the present disclosure are not limited to the foregoing case. That is to say, any processing may be performed as long as the second system control circuit 6B calculates an amplitude of the first period components extracted from the detection values of the output signals of the second system two output windings. For example, the second system control circuit 6B may detect the maximum value and the minimum value during a predetermined period from each of two values V1B_Fe, V2B_Fe after the extraction processing of first period component, and may calculate an amplitude from a difference between the maximum value and the minimum value. And, the second system control circuit 6B may calculate an amplitude from one of two values V1B_Fe, V2B_Fe after the extraction processing of first period component, or may calculate an amplitude from both and may calculate their average value.

(5) In each of the above-mentioned embodiments, there was explained the case where the first period TA is set smaller than the second period TB. However, embodiments of the present disclosure are not limited to the foregoing case. That is to say, the first period TA may be set larger than the second period TB. In this case, the signal processing of the first system and the signal processing of the second system related to the resolver are replaced from above Embodiment 1. Specifically, as the extraction processing of second period component, the first system control circuit 6A (the second system abnormality detection unit 35) adds the detection values V1A_S, V2A_S of the output signals of the first system two output windings detected at this time detection timing, and the detection values V1A_Solde, V2A_Solde of the output signals of the first system two output windings detected at a detection timing before a second period extraction processing interval ΔTe1 from this time detection timing; and extracts the components of the second period from the first system output signals. The second period extraction processing interval ΔTe1 is set as shown in the next equation. Herein, Q is an integer greater than or equal to 0, for example, it is set to Q=0.

$$\Delta Te1 = TA/2 + TA \times Q \quad (22)$$

And, as the extraction processing of first period component, the second system control circuit 6B (the first system abnormality detection unit 45) subtracts the detection values V1B_Solde, V2B_Solde of the output signals of the second system two output windings detected at a detection timing before a first period extraction processing interval ΔTe2 from this time detection timing, from the detection values V1B_S, V2B_S of the output signals of the second system two output windings detected at this time detection timing; and extracts the components of the second period from the second system output signals. The first period extraction processing interval $\Delta Te2$ is set as shown in the next equation. Herein, O is an integer greater than or equal to 1, for example, it is set to 0-1.

$$\Delta T2e = TB \times O \quad (23)$$

In this case, the first period TA may be set to an even multiple of the second period TB, as shown in the next equation. Herein, N is an integer greater than or equal to 1, for example, it is set to N-1.

$$TA = TB \times 2/N \quad (24)$$

(6) In each of the above-mentioned embodiments, there was explained the case where the first system control circuit 6A determines the operation stop of the second system control circuit 6B based on the components of the second period extracted from the first system output signals, and the second system control circuit 6B determines the operation stop of the first system control circuit 6A based on the components of the first period extracted from the second system output signals. However, embodiments of the present disclosure are not limited to the foregoing case. That is to say, like PLT 1, a mutual operation check may also be performed additionally, by a mutual communication between the first system control circuit 6A and the second system control circuit 6B. In this case, even when detecting the operation abnormality of the control circuit of the other by the mutual communication, when the operation stop of the control circuit of the other cannot be determined from the components of the first period or the components of the second period like the above embodiment, it can be determined that the communication device for performing the mutual communication is abnormal.

(7) In each of the above-mentioned embodiments, there was explained the case where the second system control circuit 6B determines the operation stop of the first system control circuit 6A based on the components of the first period extracted from the second system output signals. However, embodiments of the present disclosure are not limited to the foregoing case. That is to say, the second system control circuit 6B may not extract the components of the first period from the second system output signals, and may not determine the operation stop of the first system control circuit 6A.

(8) In each of the above-mentioned embodiments, there was explained the case where the resolver 2 is configured as shown in FIG. 4. However, embodiments of the present disclosure are not limited to the foregoing case. That is to say, as the schematic diagram of the resolver 1 is shown in FIG. 25, the first system excitation winding 10A and the first system two output windings 111A, 112A may be wound around the first system resolver stator 13A; and the second system excitation winding 10B and the second system two output windings 111B, 112B may be wound around the second resolver system stator 13B. In this figure, the first system resolver stator 13A and the second system resolver stator 13B are arranged adjacent to each other in the axial direction; and a magnetic interference occurs between the first system windings and the second system windings. In FIG. 25, the teeth and the windings of the first system resolver stator 13A, and the teeth and the windings of the second system resolver stator 13B are omitted in figure. The first system resolver stator 13A and the second system resolver stator 13B are coaxially arranged adjacent to each other in the axial direction; and the resolver rotor 14 formed integrally is arranged on the radial-direction inner side of the first system resolver stator 13A and the second system resolver stator 13B. The resolver rotor 14 is provided with a plurality of projection parts which are arranged equally in the circumferential direction on the peripheral part of the rotor. The rotor part located on the radial-direction inner side of the first system resolver stator 13A and the rotor part located on the radial-direction inner side of the second system resolver stator 13B have the same shape of the projection parts. The rotor part of the radial-direction inner side of the first system resolver stator 13A and the rotor part of the radial-direction inner side of the second system resolver stator 13B may have the different shapes and the different numbers of the projection parts with each other; and these may be the different bodies connected so as to rotate integrally.

(9) In each of the above-mentioned embodiments, there was explained the case where the first system control circuit 6A (the first system voltage command calculation unit 33) calculates the first system three-phase voltage commands Vu1_ref, Vv1_ref, Vw1_ref by the current feedback control on the dq-axis rotating coordinate system rotated synchronizing with the first system angle $\theta 1$; and the second system control circuit 6B (the second system voltage command calculation unit 43) calculates the second system three-phase voltage commands Vu2_ref, Vv2_ref, Vw2_ref by the current feedback control on the dq-axis rotating coordinate system rotated synchronizing with the second system angle $\theta 2$. However, embodiments of the present disclosure are not limited to the foregoing case.

That is to say, any computation method may be used as long as the first system control circuit 6A (the first system voltage command calculation unit 33) calculates the first system three-phase voltage commands Vu1_ref, Vv1_ref, Vw1_ref based on the first system angle $\theta 1$. For example, the first system control circuit 6A may change phases of AC signals which change periodically, such as sine waves, or rectangular waves, according to the first system angle $\theta 1$.

Any computation method may be used as long as the second system control circuit 6B (the second system voltage command calculation unit 43) calculates the second system three-phase voltage commands Vu2_ref, Vv2_ref, Vw2_ref based on the second system angle $\theta 2$. For example, the second system control circuit 6B may change phases of AC signals which change periodically, such as sine waves, or rectangular waves, according to the second system angle $\theta 2$.

(10) In above-mentioned Embodiment 2, there was explained the case where the AC rotary machine 1 is the AC rotary machine for the electric power steering apparatus. However, the AC rotary machine 1 may be an AC rotary machine for various kinds of applications, such as an AC rotary machine for vehicle used as the driving force source of wheels, or an AC rotary machine for driving elevator.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1: AC Rotary Machine, 2: Resolver, 4A: First system inverter, 4B: Second system inverter, 6A: First system control circuit, 6B: Second system control circuit, 10A: First system excitation winding, 10B: Second system excitation winding, 111A: First output winding, 112A: Second output winding, 111B: Third output winding, 112B: Fourth output winding, Amp1: Amplitude value of first period components, Amp2: Amplitude value of second period components, N1: First system three-phase windings N2: Second system three-phase windings, TA: First period, TB: Second period, $\Delta Te1$: Second period extraction processing interval, $\theta Te2$: First period extraction processing interval, $\theta 1$: First system angle, $\theta 2$: Second system angle

What is claimed is:

1. An AC rotary machine apparatus, comprising:
    an AC rotary machine that is provided with first system plural-phase windings and second system plural-phase windings;
    a first system inverter that is provided with plural switching devices for applying voltage to the first system plural-phase windings;
    a second system inverter that is provided with plural switching devices for applying voltage to the second system plural-phase windings;
    a resolver that is a sensor for detecting a rotational position of the AC rotary machine, and is provided with a first system excitation winding, first system two output windings, a second system excitation winding, and second system two output windings, in which a magnetic interference occurs between a first system and a second system;
    a first system control circuit that applies AC voltage with a first period to the first system excitation winding, detects first system output signals outputted from the first system two output windings, calculates first system voltage commands for applying to the first system plural-phase windings, and turns on and off the plural switching devices of the first system inverter and applies voltage to the first system plural-phase windings, based on the first system voltage commands; and
    a second system control circuit that applies AC voltage with a second period which is different from the first period to the second system excitation winding, detects second system output signals outputted from the second system two output windings, detects a second system angle of the AC rotary machine based on components of the second period included in the second system output signals, calculates second system voltage commands for applying to the second system plural-phase windings based on the second system angle, and turns on and off the plural switching devices of the second system inverter and applies voltage to the second system plural-phase windings, based on the second system voltage commands,
    wherein the first system control circuit extracts components of the second period from the first system output signals, and determines whether operation of the second system control circuit stops based on the extracted components of the second period.

2. The AC rotary machine apparatus according to claim 1,
    wherein the first system control circuit detects a first system angle of the AC rotary machine based on components of the first cycle included in the first system output signals, and calculates the first system voltage commands based on the first system angle, and
    wherein the second system control circuit extracts components of the second period from the second system output signals, and determines whether operation of the first system control circuit stops based on the extracted components of the second period.

3. The AC rotary machine apparatus according to claim 2,
    wherein, when determining that the operation of the second system control circuit stops, the first system control circuit changes the first system voltage commands so that an output torque by the first system plural-phase windings increases more than when determining that the operation of the second system control circuit does not stop, and
    wherein, when determining that the operation of the first system control circuit stops, the second system control circuit changes the second system voltage commands so that an output torque by the second system plural-phase windings increases more than when determining that the operation of the first system control circuit does not stop.

4. The AC rotary machine apparatus according to claim 2,
    wherein the AC rotary machine is an AC rotary machine for an electric power steering apparatus which outputs an electric steering torque which drives a steering apparatus of a vehicle,
    wherein, when determining that the operation of the first system control circuit and the operation of the second system control circuit do not stop, the first system control circuit and the second system control circuit share the electric steering torque with the first system plural-phase windings and the second system plural-phase windings to output,
    wherein, when determining that the operation of the second system control circuit stops, the first system control circuit changes the first system voltage commands so that a sharing rate by which the electric steering torque is shared with the first system plural-phase windings to output increases more than when determining that the operation of the second system control circuit does not stop, and
    wherein, when determining that the operation of the first system control circuit stops, the second system control circuit changes the second system voltage commands so that a sharing rate by which the electric steering torque is shared with the second system plural-phase windings to output increases more than when determining that the operation of the first system control circuit does not stop.

5. The AC rotary machine apparatus according to claim 2,
    wherein the first system control circuit determines that the operation of the second system control circuit stops when an amplitude of the extracted components of the second period is larger than a determination threshold for second period component, and determines that the operation of the second system control circuit does not stop when the amplitude of the extracted components of the second period is not larger than the determination threshold for second period component, and
    wherein the second system control circuit determines that the operation of the first system control circuit stops when an amplitude of the extracted components of the first period is larger than a determination threshold for first period component, and determines that the operation of the first system control circuit does not stop when the amplitude of the extracted components of the first period is larger than the determination threshold for first period component.

6. The AC rotary machine apparatus according to claim 2, wherein a first output winding and a second output winding which are the first system two output windings are provided so that phases of those output signals are mutually different 90 degrees in an electrical angle,
wherein a third output winding and a fourth output winding which are the second system two output windings are provided so that phases of those output signals are mutually different 90 degrees in the electrical angle,
wherein the first system control circuit extracts the component of the second period from the output signal of the first output winding, and extracts the component of the second period from the output signal of the second output winding, calculates an amplitude value of second period component by adding a square value of the extracted component of the second period of the first output winding, and a square value of the extracted component of the second period of the second output winding, determines that the operation of the second system control circuit stops when the amplitude value of second period component is larger than the determination threshold for second period component, and determines that the operation of the second system control circuit does not stop when the amplitude value of second period component is not larger than the determination threshold for second period component, and
wherein the second system control circuit extracts the component of the first period from the output signal of the third output winding, and extracts the component of the first period from the output signal of the fourth output winding, calculates an amplitude value of first period component by adding a square value of the extracted component of the first period of the third output winding, and a square value of the extracted component of the first period of the fourth output winding, determines that the operation of the first system control circuit stops when the amplitude value of first period component is larger than the determination threshold for first period component, and determines that the operation of the first system control circuit does not stop when the amplitude value of first period component is not larger than the determination threshold for first period component.

7. The AC rotary machine apparatus according to claim 2, wherein, when the first period is set smaller than the second period, the first system control circuit extracts the components of the second period from the first system output signals, by subtracting detection values of the output signals of the first system two output windings detected at a detection timing before a second period extraction processing interval from this time detection timing, from detection values of the output signals of the first system two output windings detected at this time detection timing, and herein the second period extraction processing interval is set to TA×O (O is an integer greater than or equal to 1) by setting the first period to TA, and
the second system control circuit extracts the components of the first period from the second system output signals, by adding detection values of the output signals of the second system two output windings detected at this time detection timing, and detection values of the output signals of the second system two output windings detected at a detection timing before a first period extraction processing interval from this time detection timing, and herein the first period extraction processing interval is set to TB/2+TB×Q (Q is an integer greater than or equal to 0) by setting the second period to TB; and
wherein, when the first period is set larger than the second period, the first system control circuit extracts the components of the second period from the first system output signals, by adding detection values of the output signals of the first system two output windings detected at this time detection timing, and detection values of the output signals of the first system two output windings detected at a detection timing before a second period extraction processing interval from this time detection timing, and herein the second period extraction processing interval is set to TA/2+TA×Q (Q is an integer greater than or equal to 0) by setting the first period to TA, and
the second system control circuit extracts the components of the first period from the second system output signals, by subtracting detection values of the output signals of the second system two output windings detected at a detection timing before a first period extraction processing interval from this time detection timing, from detection values of the output signals of the second system two output windings detected at this time detection timing, and herein the first period extraction processing interval is set to TB×O (O is a integer greater than or equal to 1) by setting the second period to TB.

8. The AC rotary machine apparatus according to claim 7, wherein, when the first period is set smaller than the second period, the second period is set to TA×2×N (N is an integer greater than or equal to 1) by setting the first period to TA, and
wherein, when the first period is set larger than the second period, the first period is set to TB×2×N (N is an integer greater than or equal to 1) by setting the second period to TB.

* * * * *